United States Patent
Hiroki et al.

(10) Patent No.: US 9,941,506 B2
(45) Date of Patent: Apr. 10, 2018

(54) CURRENT COLLECTOR, SECONDARY BATTERY, ELECTRONIC DEVICE, AND MANUFACTURING METHOD THEREOF

(71) Applicant: SEMICONDUCTOR ENERGY LABORATORY CO., LTD., Atsugi-shi, Kanagawa-ken (JP)

(72) Inventors: Masaaki Hiroki, Kanagawa (JP); Ryota Tajima, Kanagawa (JP)

(73) Assignee: Semiconductor Energy Laboratory Co., Ltd., Kanagawa-ken (JP)

( * ) Notice: Subject to any disclaimer, the term of this patent is extended or adjusted under 35 U.S.C. 154(b) by 480 days.

(21) Appl. No.: 14/617,472

(22) Filed: Feb. 9, 2015

(65) Prior Publication Data

US 2015/0243962 A1    Aug. 27, 2015

(30) Foreign Application Priority Data

Feb. 21, 2014  (JP) ................. 2014-031995
Apr. 11, 2014  (JP) ................. 2014-082331
Jun. 23, 2014  (JP) ................. 2014-128649

(51) Int. Cl.
*H01M 4/72*     (2006.01)
*H01M 4/02*     (2006.01)
*H01M 4/04*     (2006.01)
*H01M 4/139*    (2010.01)

(52) U.S. Cl.
CPC ........... *H01M 4/02* (2013.01); *H01M 4/0404* (2013.01); *H01M 4/139* (2013.01); *H01M 2004/021* (2013.01); *H01M 2220/30* (2013.01)

(58) Field of Classification Search
CPC ...... H01M 4/02; H01M 4/0404; H01M 4/139; H01M 2004/021; H01M 2220/30; Y02E 60/122; Y02P 70/54
See application file for complete search history.

(56) References Cited

U.S. PATENT DOCUMENTS 6,461,769 B1   10/2002   Ando et al.
6,664,005 B2   12/2003   Kezuka et al.
6,740,454 B1    5/2004   Ando et al.
(Continued)

FOREIGN PATENT DOCUMENTS

CN    001314723 A    9/2001
CN    101051684 A   10/2007
(Continued)

OTHER PUBLICATIONS

International Search Report (Application No. PCT/IB2015/051041) dated Jun. 16, 2015.

(Continued)

*Primary Examiner* — Raymond Alejandro
(74) *Attorney, Agent, or Firm* — Nixon Peabody LLP; Jeffrey L. Costellia

(57) ABSTRACT

Part of an electrode, specifically a current collector and an active material layer, for a secondary battery is subjected to cutting processing to have a complex shape. For example, a stack of the first current collector and the first active material layer has a first slit and a second slit. The first slit extends from a first edge of the stack. The second slit extends from a second edge of the stack, is the slit closest to an electrode tab, and is not parallel or vertical to the longest edge of the current collector.

17 Claims, 17 Drawing Sheets

(56) References Cited

U.S. PATENT DOCUMENTS

| | | |
|---|---|---|
| 8,940,441 B2 | 1/2015 | Hirose et al. |
| 2008/0176133 A1 | 7/2008 | Hirose et al. |
| 2010/0277443 A1 | 11/2010 | Yamazaki et al. |
| 2010/0277448 A1 | 11/2010 | Okamoto et al. |
| 2013/0143090 A1 | 6/2013 | Hosoya et al. |
| 2015/0140400 A1 | 5/2015 | Yamazaki et al. |

FOREIGN PATENT DOCUMENTS

| | | | | |
|---|---|---|---|---|
| EP | 1137088 A | 9/2001 | | |
| JP | 2001-266894 | * 9/2001 | ............ | H01M 10/04 |
| JP | 2001-266894 A | 9/2001 | | |
| JP | 2007-280665 A | 10/2007 | | |
| JP | 2010-282181 A | 12/2010 | | |
| JP | 2010-282183 A | 12/2010 | | |
| JP | 2011-018637 A | 1/2011 | | |
| JP | 2013-089606 A | 5/2013 | | |
| KR | 2007-0099443 A | 10/2007 | | |

OTHER PUBLICATIONS

Written Opinion (Application No. PCT/IB2015/051041) dated Jun. 16, 2015.

* cited by examiner

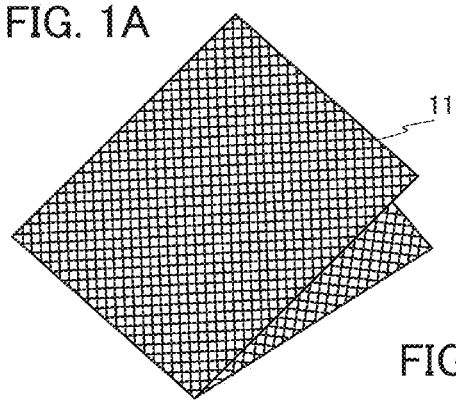
FIG. 1A
FIG. 1C
FIG. 1B
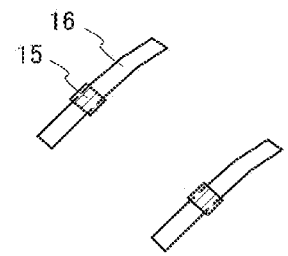
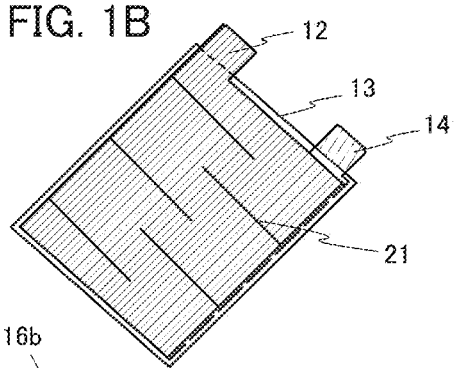
FIG. 1D
FIG. 1F
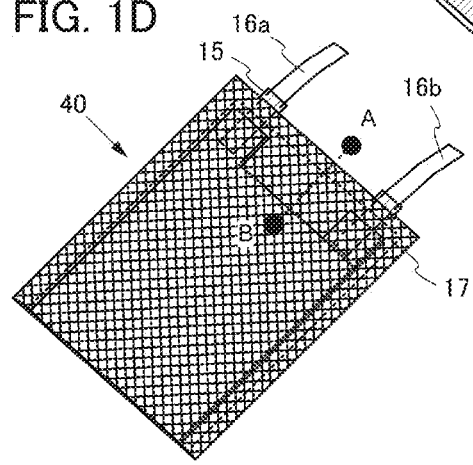
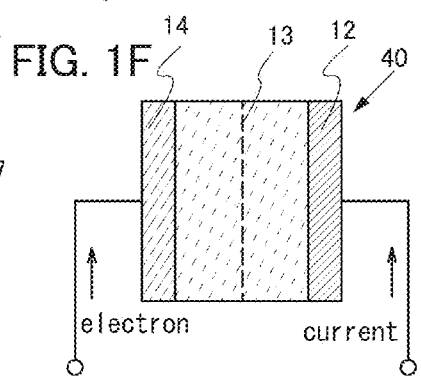
FIG. 1E
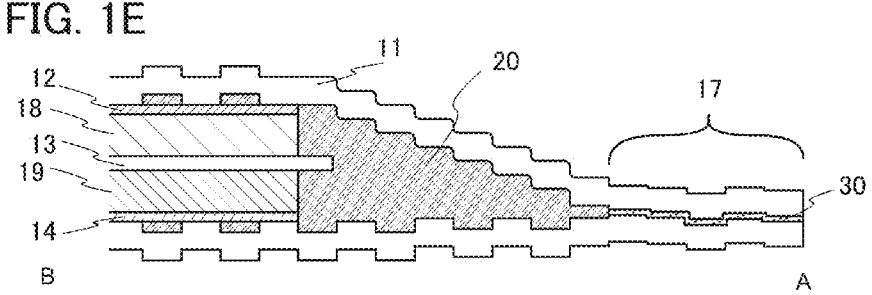

FIG. 6A
FIG. 6B
FIG. 6C
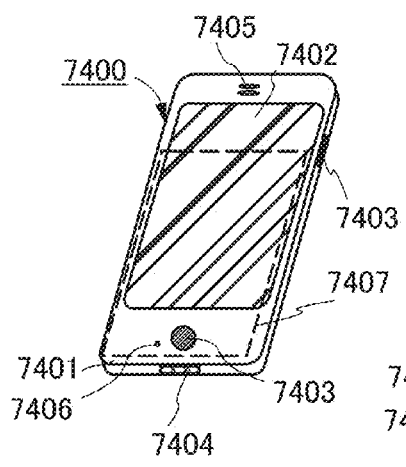
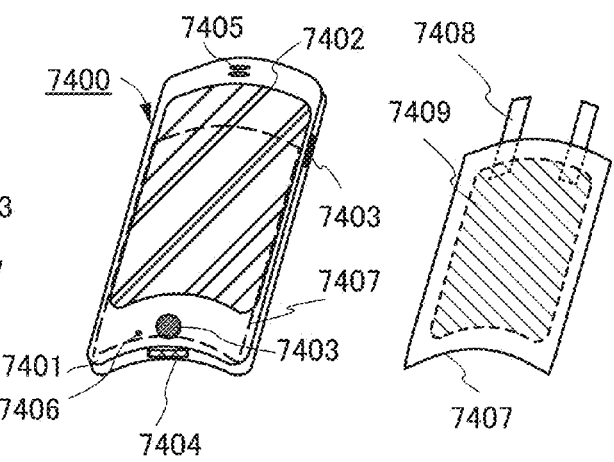
FIG. 6D
FIG. 6E
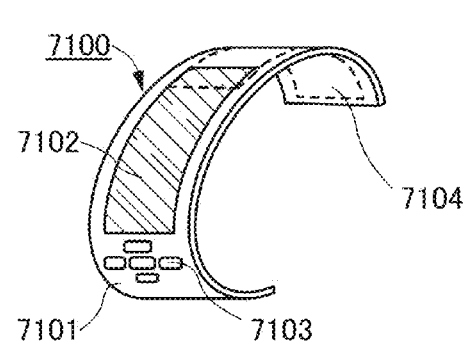
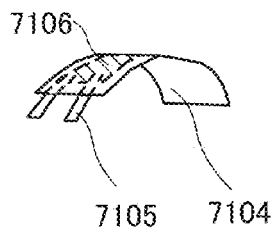

0 times 1000 times 3000 times 6000 times 10000 times

CURRENT COLLECTOR, SECONDARY BATTERY, ELECTRONIC DEVICE, AND MANUFACTURING METHOD THEREOF

TECHNICAL FIELD

One embodiment of the present invention relates to a secondary battery and an electronic device including the secondary battery.

Note that one embodiment of the present invention is not limited to the above technical field. The technical field of one embodiment of the invention disclosed in this specification and the like relates to an object, a method, or a manufacturing method. In addition, one embodiment of the present invention relates to a process, a machine, manufacture, or a composition of matter. Specifically, examples of the technical field of one embodiment of the present invention disclosed in this specification include a semiconductor device, a display device, a light-emitting device, a power storage device, a storage device, a method for driving any of them, and a method for manufacturing any of them.

Note that electronic devices in this specification mean all devices including secondary batteries, and electro-optical devices including secondary batteries, information terminal devices including secondary batteries, vehicles including secondary batteries, and the like are all electronic devices.

BACKGROUND ART

Display devices used while being worn on human bodies, such as display devices mounted on heads, have recently been developed and are referred to as head-mounted displays or wearable displays. It is desired that not only display devices but also electronic devices used while being worn on human bodies (such electronic devices are also referred to as wearable devices), such as hearing aids, have a light weight and a small size.

Most wearable devices and portable information terminals include secondary batteries that can be repeatedly charged and discharged, and have problems in that there is a limitation on the time for operation of the wearable devices and the portable information terminals because of their light weight and compactness. Secondary batteries used in wearable devices and portable information terminals should be lightweight and compact and should be able to be used for a long time.

Along with a decrease in weight of electronic devices, it is demanded that secondary batteries for supplying power to electronic devices also have a light weight and a small size.

Electronic book readers including flexible display devices are disclosed in Patent Documents 1 and 2.

REFERENCES

Patent Documents

[Patent Document 1] Japanese Published Patent Application No. 2010-282181
[Patent Document 2] Japanese Published Patent Application No. 2010-282183

DISCLOSURE OF INVENTION

An object is to provide a secondary battery suitable for a wearable device. Another object is to provide a novel power storage device.

Another object is to provide an electronic device having a novel structure, specifically, an electronic device having a novel structure that can be changed in appearance in various ways. Another object is to provide an electronic device having a novel structure that can have various forms and a secondary battery that fits the forms of the electronic device.

Note that the descriptions of these objects do not disturb the existence of other objects. In one embodiment of the present invention, there is no need to achieve all the objects. Other objects will be apparent from and can be derived from the description of the specification, the drawings, the claims, and the like.

In the case of fabricating and using a flexible secondary battery or fabricating a bent secondary battery, when a plurality of electrodes is bent, the plurality of electrodes is bent with different curvatures. An electrode far from a curvature center is more bent than an electrode close to the curvature center, so that the position of the end portion of the electrode far from the curvature center is shifted or the end portion of the electrode far from the curvature center is extended. The end portion of the electrode includes a portion in contact with a lead (the portion is also referred to as an electrode tab).

In the case of fabricating a thin secondary battery, a plurality of combinations each including a first electrode (a positive electrode), an active material layer, and a second electrode (a negative electrode) is stacked in a region surrounded by an exterior body. After a plurality of first electrodes is made to overlap with each other, the first electrodes are subjected to ultrasonic welding or the like in order to fix end portions thereof. Similarly, after second electrodes are made to overlap with each other, the second electrodes are subjected to ultrasonic welding or the like in order to fix end portions thereof.

With the increase in the number of stacked layers, a capacity and a thickness thereof are increased. Therefore, the electrode far from the curvature center is more bent than the electrode close to the curvature center, so that the position of the end portion of the electrode far from the curvature center is significantly shifted or the end portion of the electrode far from the curvature center is extended.

In view of this, part of an electrode to be used for a secondary battery is subjected to cutting processing to have a complex shape. This suppresses the positional shift of the end portion of the electrode far from the curvature center from the electrode close to the curvature center due to the larger degree of bending of the electrode far from the curvature center than that of the electrode close to the curvature center, or relieves tension to be applied to the electrode far from the curvature center.

Specifically, after an active material layer is formed over a current collector, laser processing for removing part of the current collector and part of the active material layer in an irradiation region is performed using laser light or the like. An opening, a cut, or a gap which can be made by cutting by laser processing can have a linear shape, a geometric shape (e.g., a polygonal shape or an indefinite shape), or a circular shape. A plurality of openings or a plurality of cuts may be made in a regular manner, or a plurality of openings or a plurality of cuts may be made in an irregular manner. A secondary battery is fabricated using an electrode having a shape part of which is cut out or an electrode having a shape in part of which a cut is made. For example, a secondary battery including an electrode having a shape in which cuts (e.g., long cuts or jagged cuts) are made alternately is fabricated.

At least one or both of the positive electrode and the negative electrode to be used for a secondary battery may be subjected to laser processing.

In the case of a bent secondary battery, the positional relation between the electrode close to the curvature center and the electrode far from the curvature center are predetermined. Therefore, cutting by laser processing may be performed on part of at least the electrode farthest from the curvature center. The processing is performed so that the current collector is not divided into two by cutting. In the case of the electrode farthest from the curvature center, a cut is provided so that tension on the electrode is relieved. In the case of the electrode close to the curvature center, a cut is provided so that a compressive force to the electrode is relieved.

In the case of a flexible secondary battery, in order to make the secondary battery bendable in either direction, cutting by laser processing is preferably performed on at least the outermost electrodes (i.e., the positive electrode in the uppermost layer, the positive electrode in the lowermost layer, the negative electrode in the uppermost layer, and the negative electrode in the lowermost layer) in bending in a given direction.

Note that a flexible secondary battery refers to a secondary battery part of which can be bent a plurality of times, whereas a bent secondary battery refers to a secondary battery which is fixed in a state of being bent one time in a manufacturing process of incorporating the secondary battery in an electronic device.

The cutting processing is not limited to laser processing by which part of the current collector and part of the active material layer are removed. The cutting processing may be performed using an edged tool such as a cutter or scissors or using a cutting tool such as a lathe or a milling machine. Furthermore, instead of performing cutting by scanning part of the current collector and part of the active material layer with laser light, ultra-high pressure water may be discharged to part of the current collector and part of the active material layer to remove part of the current collector and part of the active material layer.

The cut and the opening are made to provide the current collector with a portion for relieving tension, but one embodiment of the present invention is not particularly limited thereto. A locally thin portion may be provided to relieve the tension at the time of bending the secondary battery. In that case, the current collector has a shape including at least two different inclined surfaces and a curved surface between the two inclined surfaces. An angle formed between the two inclined surfaces is greater than or equal to 90° and less than 180°, preferably greater than or equal to 120° and less than or equal to 170°. Furthermore, a region having the curved surface between the two inclined surfaces is thinner than the other region. A current collector may be provided with a combination of the cut, the opening, and the thin portion or a plurality of combinations thereof.

In the case where the portion for relieving tension is not provided in the current collector, a crack is made owing to the tension at the time of bending the secondary battery. Repetitive bending of the secondary battery might widen the crack to tear (split) the current collector. The tear in the current collector reduces the area of current flow, and electric fields are concentrated in the portion, so that a short circuit occurs or the degradation of the secondary battery or the like progresses in some cases. Furthermore, adhesion at the crack (adhesion at the interface between the current collector and the active material layer) is reduced, and a function as the secondary battery is lost in some cases.

A flexible secondary battery or a bent secondary battery can be obtained.

Furthermore, when an electrode of a secondary battery is bent by bending the secondary battery, a crack in the electrode due to the extension of an end portion of the electrode is prevented because part of the electrode is cut. As a result, a secondary battery capable of being bent or a bent secondary battery can have improved reliability. Furthermore, in the case where a housing of an electronic device has flexibility, the electronic device including the battery can be bent wholly or partly.

BRIEF DESCRIPTION OF DRAWINGS

FIGS. 1A to 1F are perspective views and cross-sectional views showing one embodiment of the present invention.

FIGS. 6A to 6E are external perspective views of an electronic device and a secondary battery of one embodiment of the present invention.

BEST MODE FOR CARRYING OUT THE INVENTION

Figure 2A:
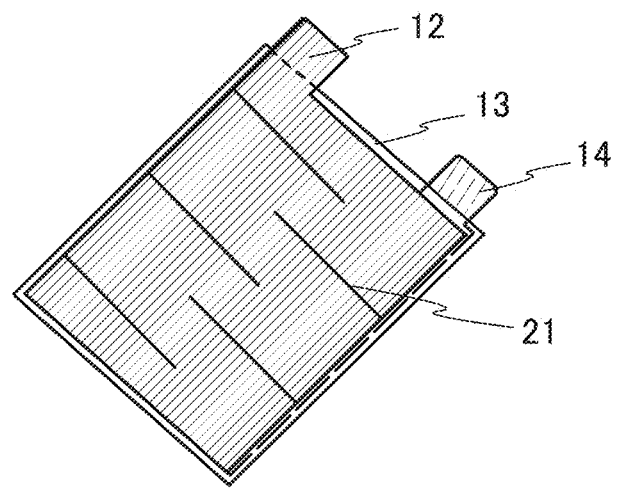
FIGS. 2A to 2C are a perspective view, a top view, and a cross-sectional view showing one embodiment of the present invention.

Embodiments of the present invention will be described below in detail with reference to the drawings. However, the present invention is not limited to the description below, and it is easily understood by those skilled in the art that modes and details disclosed herein can be modified in various ways. Further, the present invention is not construed as being limited to description of the embodiments.

Embodiment 1

In this embodiment, an example of fabricating a lithium-ion secondary battery including a current collector provided with a plurality of cuts and a film embossed with a pattern as an exterior body will be described.

First, a sheet made of a flexible material is prepared. As the sheet, a stacked body, a metal film provided with an adhesive layer (also referred to as a heat-seal layer) or sandwiched between adhesive layers is used. As the adhesive layer, a heat-seal resin film containing, e.g., polypropylene or polyethylene is used. In this embodiment, a metal sheet, specifically, aluminum foil whose top surface is provided with a nylon resin and whose bottom surface is provided with a stack including an acid-resistant polypropylene film and a polypropylene film is used as the sheet.

The sheet is cut to prepare a film, and the film is embossed to form a depression and a projection so that the pattern can be visually recognized. In this embodiment, both surfaces of a film are provided with depressions and projections to have patterns. As shown in FIG. 1A, in the case of having a rectangular shape, a film 11 is folded in half so that two sides of the folded film 11 overlap with each other, and is sealed on three sides with an adhesive layer.

In order to fabricate a bendable secondary battery or a bent secondary battery, the film serving as an exterior body or the like preferably has a structure which relieves a strain caused by stress. The depressions or projections of the film are formed by pressing, e.g., embossing.

Note that embossing refers to processing for forming unevenness on a film by bringing an embossing roll whose surface has unevenness into contact with the film with pressure. The embossing roll is a roll whose surface is patterned.

The depressions or projections of the film formed by embossing form an obstructed space sealed by the film serving as a part of a wall of the sealing structure and whose inner volume is variable. It can be said that the depressions or projections of the film form an accordion structure (bellows structure) in this obstructed space. Note that embossing, which is a kind of pressing, is not necessarily employed and any method that allows formation of a relief on part of the film is employed.

Although the secondary battery can have any of a variety of structures, a structure where a film is used as an exterior body is employed here. Note that the film used as an exterior body is a single-layer film selected from metal films (e.g., an aluminum film, a stainless steel film, and a nickel steel film), a plastic film made of an organic material, a hybrid material film containing an organic material (e.g., an organic resin or fiber) and an inorganic material (e.g., ceramic), carbon-containing films (e.g., a carbon film and a graphite film), and the like or a layered film including two or more of the above films. Metal films are easily embossed. Forming depressions or projections by embossing increases the surface area of the film exposed to outside air, achieving efficient heat dissipation.

In the above structure, the exterior body of the secondary battery can change its form in the range of radius of curvature from 10 mm to 150 mm, preferably from 30 mm to 150 mm. One or two films are used as the exterior body of the secondary battery. When the secondary battery with a sealing structure using a laminate film (which is referred to as a secondary battery with a laminated structure) is bent to have an arc-shaped cross section, the battery is sandwiched by the two curved surfaces of the film.

Figure 11A:
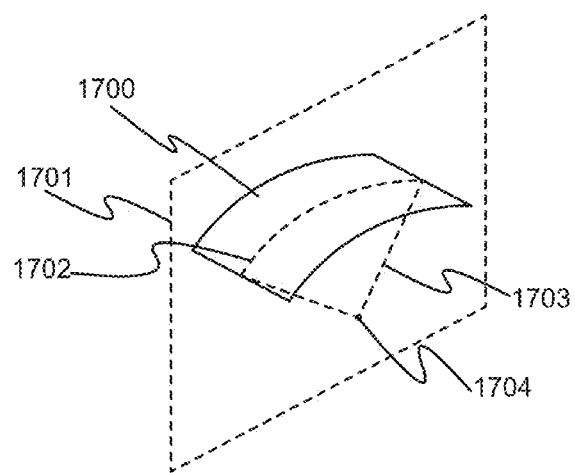
FIGS. 11A to 11C illustrate a radius of curvature of a surface.
Figure 11B:
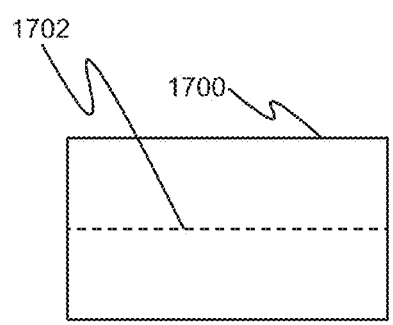
Figure 11C:
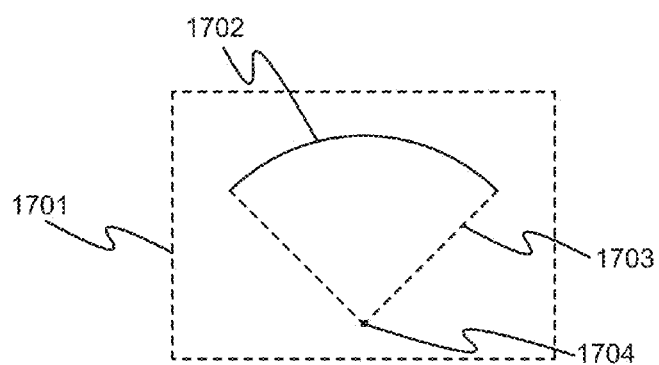

Description is given of the radius of curvature of a surface with reference to FIGS. 11A to 11C. In FIG. 11A, on a plane surface 1701 along which a curved surface 1700 is cut, part of a curve 1702 of the curved surface 1700 is approximate to an arc of a circle, and the radius of the circle is referred to as a radius 1703 of curvature and the center of the circle is referred to as a center 1704 of curvature. FIG. 11B is a top view of the curved surface 1700. FIG. 11C is a cross-sectional view of the curved surface 1700 taken along the plane surface 1701. When a curved surface is cut along a plane surface, the radius of curvature of a curve in a cross section differs depending on the angle between the curved surface and the plane or on the cut position, and the smallest radius of curvature is defined as the radius of curvature of a surface in this specification and the like.

Figure 12A:
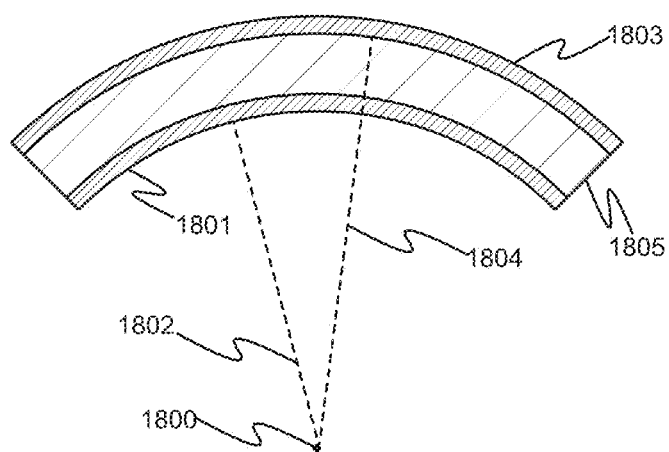
FIGS. 12A to 12D illustrate a center of curvature.
Figure 12B:
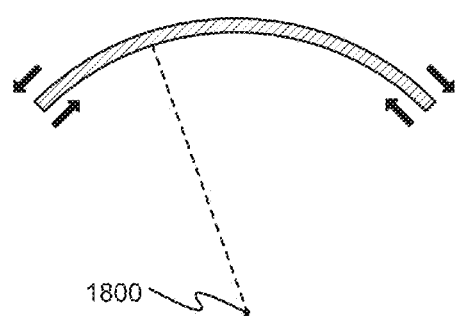

In the case of curving a secondary battery in which a component 1805 including electrodes and an electrolytic solution is sandwiched between two films as an exterior body, a radius 1802 of curvature of a film 1801 close to a center 1800 of curvature of the secondary battery is smaller than a radius 1804 of curvature of a film 1803 far from the center 1800 of curvature (FIG. 12A). When the secondary battery is curved and has an arc-shaped cross section, compressive stress is applied to a surface of the film close to the center 1800 of curvature and tensile stress is applied to a surface of the film far from the center 1800 of curvature (FIG. 12B). However, by forming a pattern of projections and depressions on surfaces of the exterior bodies, influence of distortion can be reduced to be acceptable even when the compressive stress and the tensile stress are applied. For this reason, the secondary battery can change its form such that the exterior body on the side closer to the center of curvature has a curvature radius greater than or equal to 10 mm, preferably greater than or equal to 30 mm.

Figure 12C:
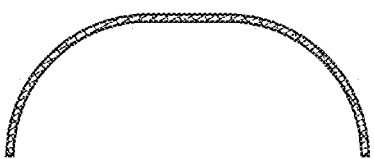
Figure 12D:

Note that the cross-sectional shape of the secondary battery is not limited to a simple arc shape, and the cross section can be partially arc-shaped; for example, a shape illustrated in FIG. 12C, a wavy shape illustrated in FIG. 12D, and an S shape can be used. When the curved surface of the secondary battery has a shape with a plurality of centers of curvature, the secondary battery can change its form such that a curved surface with the smallest radius of curvature among radii of curvature with respect to the plurality of centers of curvature, which is a surface of the exterior body on the side closer to the center of curvature, has a curvature radius greater than or equal to 10 mm, preferably greater than or equal to 30 mm.

When a secondary battery in which an electrolytic solution and the like are held between two films functioning as an exterior body is bent, a radius of curvature of a first film is smaller than that of a second film. In addition, in the secondary battery, a pattern of the first film is different from that of the second film. When the secondary battery is curved and has an arc-shaped cross section, compressive stress is applied to a surface of the film close to the center of curvature and tensile stress is applied to a surface of the film far from the center of curvature. Even when compressive stress or tensile stress is applied to a film surface in such a manner, the influence of a strain is allowable because the exterior body has a pattern formed by depressions or projections.

Next, a positive electrode current collector 12, a separator 13, and a negative electrode current collector 14 that are stacked to constitute a secondary battery as illustrated in FIG. 1B are prepared.

The positive electrode current collector 12 and the negative electrode current collector 14 can each be formed using a highly conductive material that is not alloyed with a carrier ion of, for example, lithium, such as a metal typified by stainless steel, gold, platinum, zinc, iron, nickel, copper, aluminum, titanium, and tantalum or an alloy thereof. Alternatively, an aluminum alloy to which an element which improves heat resistance, such as silicon, titanium, neodymium, scandium, or molybdenum, is added can be used. Still alternatively, a metal element which forms silicide by reacting with silicon can be used. Examples of the metal element which forms silicide by reacting with silicon include zirconium, titanium, hafnium, vanadium, niobium, tantalum, chromium, molybdenum, tungsten, cobalt, nickel, and the like. The current collectors can each have a foil-like shape, a plate-like shape (sheet-like shape), a punching-metal shape, an expanded-metal shape, or the like as appropriate. The current collectors each preferably have a thickness of 5 µm to 30 µm inclusive. Note that the example in which one combination of the positive electrode current collector 12, the separator 13, and the negative electrode current collector 14 that are stacked is held in a region surrounded by the exterior body is illustrated here for simplicity. To increase the capacity of the secondary battery, a plurality of combinations is preferably stacked and held in a region surrounded by the exterior body.

As shown in FIG. 1B, the positive electrode current collector 12 has a shape with a plurality of cuts 21.

Owing to the shape with the plurality of cuts 21, the positive electrode current collector 12 is wholly expanded when being bent. Therefore, the positional shift of an end portion can be made small. Furthermore, the positive electrode current collector 12 partly has a twisted shape, i.e., a shape with a curved portion when being bent. Hence, the positive electrode current collector 12 can also be referred to as a current collector having different inclined surfaces. Alternatively, the positive electrode current collector 12 can be referred to as a current collector provided with a cut or an opening between two inclined surfaces. Further alternatively, the positive electrode current collector 12 can be referred to as a current collector having a curved surface between two inclined surfaces.

As a laser light source for laser processing for forming the plurality of cuts 21 of the positive electrode current collector 12, ML-7320DL (manufactured by AMADA MIYACHI Co., LTD.) which emits light with an emission wavelength of approximately 1065 nm can be used. Laser light is emitted using the laser light source and a stage is moved; thus, laser light scanning is performed.

The laser processing is preferably performed after an active material layer is formed on one surface or both surfaces of the positive electrode current collector 12. A cutting surface formed by laser light irradiation is desirable because the current collector and the active material layer are firmly fixed to each other by application of strong energy.

Next, a lead electrode 16a and a lead electrode 16b having sealing layers 15 shown in FIG. 1C are prepared. The lead electrode 16a and the lead electrode 16b are each also referred to as a lead terminal and provided in order to lead a positive electrode or a negative electrode of a secondary battery to the outside of an exterior film. The lead electrode 16a is electrically connected to the positive electrode. As a material of the lead electrode 16a, a material which can be used for the positive electrode current collector, such as aluminum, can be used. The lead electrode 16b is electrically connected to the negative electrode. As a material of the lead electrode 16b, a material which can be used for the negative electrode current collector, such as copper, can be used.

One of the lead electrodes is electrically connected to a protruding portion of the positive electrode current collector 12 by ultrasonic welding or the like. The other lead electrode is electrically connected to a protruding portion of the negative electrode current collector 14 by ultrasonic welding or the like.

Then, two sides of the film 11 are sealed by thermocompression bonding, and one side for introduction of an electrolytic solution is left open. In thermocompression bonding, the sealing layers 15 provided over the lead electrodes are also melted, thereby fixing the lead electrodes and the film 11 to each other. After that, in a reduced-pressure atmosphere or an inert atmosphere, a desired amount of electrolytic solution is introduced to the inside of the film 11 in the form of a bag. Lastly, the side of the film which has not been subjected to thermocompression bonding and is left open is sealed by thermocompression bonding.

In this manner, a secondary battery 40 shown in FIG. 1D can be manufactured.

FIG. 1E illustrates an example of a cross section taken along the dashed line A-B in FIG. 1D.

As shown in FIG. 1E, unevenness of the film 11 is different between a region overlapping with the positive electrode current collector 12 and a thermocompression-bonded region 17. As shown in FIG. 1E, the positive electrode current collector 12, a positive electrode active material layer 18, the separator 13, a negative electrode active material layer 19, and the negative electrode current collector 14 are stacked in this order and placed inside the folded film 11, an end portion is sealed with a bonding layer 30, and the other space is provided with an electrolytic solution 20.

The positive electrode current collector 12 of the obtained secondary battery 40 is provided with the cuts. FIG. 2C is a schematic cross-sectional view (a cross-sectional view in a longitudinal direction) showing a state of bending. Note that FIG. 2A is a perspective view showing the positional relation of a stack of the positive electrode current collector 12, the separator 13, and the negative electrode current collector 14 which are placed inside the film of the secondary battery 40.

Figure 2B:
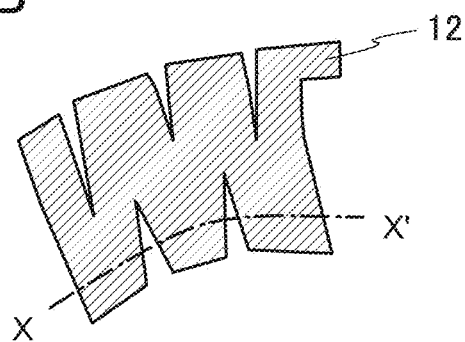
Figure 2C:
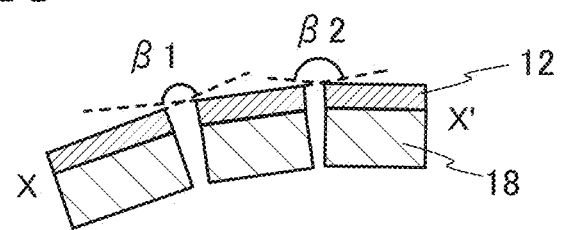

FIG. 2C is a schematic cross-sectional view cut along the dashed line X-X' in FIG. 2B which is a top view. As shown in FIG. 2C, the positive electrode current collector 12 having different inclined surfaces with the cut therebetween is provided inside the secondary battery being bent. Thus, the positive electrode current collector 12 provided with the cut can change in shape. By partly changing the shape of the positive electrode current collector 12 when the secondary battery is bent, stress applied at the time of bending the secondary battery is relieved. In FIG. 2C, two cuts are provided in the cross section cut along the dashed line X-X'. A first inclined surface and a second inclined surface form an angle $\beta 1$, whereas the second inclined surface and a third inclined surface form an angle $\beta 2$. The angle $\beta 1$ or the angle $\beta 2$ is greater than or equal to 90° and less than 180°, preferably greater than or equal to 120° and less than or equal to 170°. FIG. 2C shows an example of bending in one direction; however, even in the case of bending in the opposite direction, the first inclined surface and the second inclined surface form an angle. Furthermore, the positive electrode active material layer 18 is also provided with the cuts as shown in FIG. 2C. In the case where a binder with flexibility is used for the positive electrode active material layer 18, the cut is not necessarily made in the positive electrode active material layer 18.

Examples of positive electrode active materials that can be used for the positive electrode active material layer 18 include a composite oxide with an olivine structure, a composite oxide with a layered rock-salt structure, and a composite oxide with a spinel structure. As the positive electrode active material, a compound such as $LiFeO_2$, $LiCoO_2$, $LiNiO_2$, $LiMn_2O_4$, $V_2O_5$, $Cr_2O_5$, and $MnO_2$ can be used.

Alternatively, a complex material ($LiMPO_4$ (general formula) (M is one or more of Fe(II), Mn(II), Co(II), and Ni(II))) can be used. Typical examples of the general formula $LiMPO_4$ which can be used as a material are lithium compounds such as $LiFePO_4$, $LiNiPO_4$, $LiCoPO_4$, $LiMnPO_4$, $LiFe_aNi_bPO_4$, $LiFe_aCo_bPO_4$, $LiFe_aMn_bPO_4$, $LiNi_aCo_bPO_4$, $LiNi_aMn_bPO_4$ (a+b≤1, 0<a<1, and 0<b<1), $LiFe_cNi_dCo_ePO_4$, $LiFe_cNi_dMn_ePO_4$, $LiNi_cCo_dMn_ePO_4$ (c+d+e≤1, 0<c<1, 0<d<1, and 0<e<1), and $LiFe_fNi_gCo_hM-n_iPO_4$ (f+g+h+i≤1, 0<f<1, 0<g<1, 0<h<1, and 0<i<1).

Alternatively, a complex material such as $Li_{(2-j)}MSiO_4$ (general formula) (M is one or more of Fe(II), Mn(II), Co(II), and Ni(II); 0≤j≤2) may be used. Typical examples of the general formula $Li_{(2-j)}MSiO_4$ which can be used as a material are lithium compounds such as $Li_{(2-j)}FeSiO_4$, $Li_{(2-j)}NiSiO_4$, $Li_{(2-j)}CoSiO_4$, $Li_{(2-j)}MnSiO_4$, $Li_{(2-j)}Fe_kNi_lSiO_4$, $Li_{(2-j)}Fe_kCo_lSiO_4$, $Li_{(2-j)}Fe_kMn_lSiO_4$, $Li_{(2-j)}Ni_kCo_lSiO_4$, $Li_{(2-j)}Ni_kMn_lSiO_4$ (k+l≤1, 0<k<1, and 0<l<1), $Li_{(2-j)}Fe_mNi_nCo_qSiO_4$, $Li_{(2-j)}Fe_mNi_nMn_qSiO_4$, $Li_{(2-j)}Ni_mCo_nMn_qSiO_4$ (m+n+q≤1, 0<m<1, 0<n<1, and 0<q<1), and $Li_{(2-j)}Fe_rNi_sCo_tMn_uSiO_4$ (r+s+t+u≤1, 0<r<1, 0<s<1, 0<t<1, and 0<u<1).

Still alternatively, a nasicon compound expressed by $A_xM_2(XO_4)_3$ (general formula) (A=Li, Na, or Mg, M=Fe, Mn, Ti, V, Nb, or Al, X=S, P, Mo, W, As, or Si) can be used as the positive electrode active material. Examples of the nasicon compound are $Fe_2(MnO_4)_3$, $Fe_2(SO_4)_3$, and $Li_3Fe_2(PO_4)_3$. Further alternatively, a compound expressed by $Li_2MPO_4F$, $Li_2MP_2O_7$, or $Li_5MO_4$ (general formula) (M=Fe or Mn), a perovskite fluoride such as $NaFeF_3$ or $FeF_3$, a metal chalcogenide (a sulfide, a selenide, or a telluride) such as $TiS_2$ or $MoS_2$, an oxide with an inverse spinel crystal structure such as $LiMVO_4$, a vanadium oxide ($V_2O_5$, $V_6O_{13}$, $LiV_3O_8$, or the like), a manganese oxide, an organic sulfur compound, or the like can be used as the positive electrode active material.

In the case where carrier ions are alkali metal ions other than lithium ions, or alkaline-earth metal ions, a material containing an alkali metal (e.g., sodium and potassium) or an alkaline-earth metal (e.g., calcium, strontium, barium, beryllium, and magnesium) instead of lithium may be used as the positive electrode active material.

As the separator 13, an insulator such as cellulose (paper), polyethylene with pores, and polypropylene with pores can be used.

As an electrolyte of an electrolytic solution, a material which contains carrier ions is used. Typical examples of the electrolyte are lithium salts such as $LiPF_6$, $LiClO_4$, $LiAsF_6$, $LiBF_4$, $LiCF_3SO_3$, $Li(CF_3SO_2)_2N$, and $Li(C_2F_5SO_2)_2N$. One of these electrolytes may be used alone or two or more of them may be used in an appropriate combination and in an appropriate ratio.

Note that when carrier ions are alkali metal ions other than lithium ions or alkaline-earth metal ions, instead of lithium in the above lithium salts, an alkali metal (e.g., sodium or potassium), an alkaline-earth metal (e.g., calcium, strontium, barium, beryllium, or magnesium), may be used for the electrolyte.

As a solvent of the electrolytic solution, a material in which lithium ions can transfer is used. As the solvent of the electrolytic solution, an aprotic organic solvent is preferably used. Typical examples of aprotic organic solvents include ethylene carbonate (EC), propylene carbonate, dimethyl carbonate, diethyl carbonate (DEC), ethylmethyl carbonate (EMC), γ-butyrolactone, acetonitrile, dimethoxyethane, tetrahydrofuran, and the like, and one or more of these materials can be used. When a gelled high-molecular material is used as the solvent of the electrolytic solution or a high-molecular material for gelling is added to the electrolyte solution, safety against liquid leakage and the like is improved. Further, the storage battery can be thinner and more lightweight. Typical examples of the gelled high-molecular material include a silicone gel, an acrylic gel, an acrylonitrile gel, polyethylene oxide, polypropylene oxide, a fluorine-based polymer, and the like. Alternatively, the use of one or more of ionic liquids (room temperature molten salts) which have features of non-flammability and non-volatility as a solvent of the electrolytic solution can prevent the storage battery from exploding or catching fire even when the storage battery internally shorts out or the internal temperature increases owing to overcharging or the like. An ionic liquid is a salt in the liquid state and has high ion mobility (conductivity). Further, the ionic liquid includes a cation and an anion. Examples of such an ionic liquid are an ionic liquid containing an ethylmethylimidazolium (EMI) cation and an ionic liquid containing an N-methyl-N-propylpiperidinium ($PP_{13}$) cation.

Instead of the electrolytic solution, a solid electrolyte including an inorganic material such as a sulfide-based inorganic material or an oxide-based inorganic material, or a solid electrolyte including a high-molecular material such as a polyethylene oxide (PEO)-based high-molecular material may alternatively be used. In the case of using the solid electrolyte, a separator or a spacer is not necessary. Further, the battery can be entirely solidified; therefore, there is no possibility of liquid leakage and thus the safety of the battery is dramatically increased.

A material with which lithium can be dissolved and precipitated or a material which can reversibly react with lithium ions can be used for a negative electrode active material of the negative electrode active material layer 19; for example, a lithium metal, a carbon-based material, an alloy-based material, or the like can be used.

The lithium metal is preferable because of its low redox potential (3.045 V lower than that of a standard hydrogen electrode) and high specific capacity per unit weight and per unit volume (3860 mAh/g and 2062 mAh/cm$^3$).

Examples of the carbon-based material include graphite, graphitizing carbon (soft carbon), non-graphitizing carbon (hard carbon), a carbon nanotube, graphene, carbon black, and the like.

Examples of the graphite include artificial graphite such as meso-carbon microbeads (MCMB), coke-based artificial graphite, or pitch-based artificial graphite and natural graphite such as spherical natural graphite.

Graphite has a potential (0.1 V to 0.3 V vs. Li/Li$^+$) which is substantially as low as a lithium metal when a lithium ion is inserted into the graphite (at the time when lithium-graphite intercalation compound is formed). For this reason, a lithium-ion secondary battery can have a high operating voltage. In addition, graphite is preferable because of its advantages such as relatively high capacity per unit volume, small volume expansion, low cost, and safety greater than that of a lithium metal.

As the negative electrode active material, an alloy-based material which enables charge-discharge reaction by alloying and dealloying reaction with lithium can be used. In the case where carrier ions are lithium ions, a material containing at least one of Al, Si, Ge, Sn, Pb, Sb, Bi, Ag, Au, Zn, Cd, In, Ga, and the like can be used, for example. Such elements have higher capacity than carbon. In particular, silicon has a theoretical capacity of 4200 mAh/g, which is significantly high. For this reason, silicon is preferably used as the negative electrode active material. Examples of the material using such elements include SiO, $Mg_2Si$, $Mg_2Ge$, SnO, $SnO_2$, $Mg_2Sn$, $SnS_2$, $V_2Sn_3$, $FeSn_2$, $CoSn_2$, $Ni_3Sn_2$, $Cu_6Sn_5$, $Ag_3Sn$, $Ag_3Sb$, $Ni_2MnSb$, $CeSb_3$, $LaSn_3$, $La_3Co_2Sn_7$, $CoSb_3$, InSb, SbSn, and the like. Note that SiO refers to the powder of a silicon oxide including a silicon-rich portion and can also be referred to as $SiO_y$ (2>y>0). Examples of SiO include a material containing one or more of $Si_2O_3$, $Si_3O_4$, and $Si_2O$ and a mixture of Si powder and silicon dioxide ($SiO_2$). Furthermore, SiO may contain another element (e.g., carbon, nitrogen, iron, aluminum, copper, titanium, calcium, and manganese). In other words, SiO refers to a colored material containing two or more of single crystal silicon, amorphous silicon, polycrystal silicon, $Si_2O_3$, $Si_3O_4$, $Si_2O$, and $SiO_2$. Thus, SiO can be distinguished from $SiO_x$ (x is 2 or more), which is clear and colorless or white. Note that in the case where a secondary battery is fabricated using SiO as a material thereof and the SiO is oxidized because of repeated charge and discharge cycles, SiO is changed into $SiO_2$ in some cases.

Alternatively, for the negative electrode active material, an oxide such as titanium dioxide ($TiO_2$), lithium titanium oxide ($Li_4Ti_5O_{12}$), lithium-graphite intercalation compound ($Li_xC_6$), niobium pentoxide ($Nb_2O_5$), tungsten oxide ($WO_2$), or molybdenum oxide ($MoO_2$) can be used.

Still alternatively, as the negative electrode active material, $Li_{3-x}M_xN$ (M=Co, Ni, or Cu) with a $Li_3N$ structure, which is a nitride containing lithium and a transition metal, can be used. For example, $Li_{2.6}Co_{0.4}N_3$ is preferable because of high charge and discharge capacity (900 mAh/g and 1890 mAh/cm$^3$).

A nitride containing lithium and a transition metal is preferably used, in which case lithium ions are contained in the negative electrode active material and thus the negative electrode active material can be used in combination with a material for a positive electrode active material which does not contain lithium ions, such as $V_2O_5$ or $Cr_3O_8$. In the case of using a material containing lithium ions as a positive electrode active material, the nitride containing lithium and a transition metal can be used for the negative electrode active material by extracting the lithium ions contained in the positive electrode active material in advance.

Alternatively, a material which causes a conversion reaction can be used as the negative electrode active material. For example, a transition metal oxide with which an alloying reaction with lithium is not caused, such as cobalt oxide (CoO), nickel oxide (NiO), or iron oxide (FeO), may be used for the negative electrode active material. Other examples of the material which causes a conversion reaction include oxides such as $Fe_2O_3$, CuO, $Cu_2O$, $RuO_2$, and $Cr_2O_3$, sulfides such as $CoS_{0.89}$, NiS, or CuS, nitrides such as $Zn_3N_2$, $Cu_3N$, and $Ge_3N_4$, phosphides such as $NiP_2$, $FeP_2$, and $CoP_3$, and fluorides such as $FeF_3$ and $BiF_3$. Note that any of the fluorides can be used as the positive electrode active material because of its high potential.

The negative electrode active material layer 19 may further include a binder for increasing adhesion of active materials, a conductive additive for increasing the conductivity of the negative electrode active material layer 19, and the like in addition to the above negative electrode active materials.

In the secondary battery, for example, the separator 13 has a thickness of approximately 25 μm, the positive electrode current collector 12 has a thickness of approximately 10 μm to 40 μm, the positive electrode active material layer 18 has a thickness of approximately 100 μm, the negative electrode active material layer 19 has a thickness of approximately 100 μm, and the negative electrode current collector 14 has a thickness of approximately 8 μm to 40 μm. The film 11 has a thickness of 0.113 mm. The film 11 is embossed to a depth of approximately 500 μm. If the film 11 is embossed to a depth of 2 mm or more, the whole secondary battery is too thick; thus, the film 11 is embossed to a depth of 1 mm or less, preferably 500 μm or less. Although the bonding layer 30 is only partly shown in FIG. 1E, only a thermocompression-bonded portion of a layer made of polypropylene which is provided on the surface of the film 11 is the bonding layer 30.

FIG. 1E illustrates an example where the bottom side of the film 11 is fixed and pressure bonding is performed. In this case, the top side is greatly bent and a step is formed. Thus, when a plurality of combinations of the above stacked layers (e.g., eight or more combinations) is provided inside the folded film 11, the step is large and the top side of the film 11 might be too stressed. Furthermore, an end face of the top side of the film might be misaligned with an end face of the bottom side of the film. To prevent misalignment of the end faces, a step may also be provided for the bottom side of the film and pressure bonding may be performed at a center portion so that stress is uniformly applied.

In the obtained secondary battery 40, the surface of the film 11 serving as an exterior body has a pattern including unevenness. An edge region indicated by a dotted line in FIG. 1D is a thermocompression-bonded region 17. A surface of the thermocompression-bonded region 17 also has a pattern including unevenness. Although the unevenness in the thermocompression-bonded region 17 is smaller than that in a center portion, it can relieve stress applied when the secondary battery is bent.

Here, a current flow in charging a secondary battery will be described with reference to FIG. 1F. When a secondary battery using lithium is regarded as a closed circuit, lithium ions transfer and a current flows in the same direction. Note that in the secondary battery using lithium, an anode and a cathode change places in charge and discharge, and an oxidation reaction and a reduction reaction occur on the corresponding sides; hence, an electrode with a high redox potential is called a positive electrode and an electrode with a low redox potential is called a negative electrode. For this reason, in this specification, the positive electrode is referred to as a "positive electrode" and the negative electrode is referred to as a "negative electrode" in all the cases where charge is performed, discharge is performed, a reverse pulse current is supplied, and a charging current is supplied. The use of the terms "anode" and "cathode" related to an oxidation reaction and a reduction reaction might cause confusion because the anode and the cathode change places at the time of charging and discharging. Thus, the terms "anode" and "cathode" are not used in this specification. If the term "anode" or "cathode" is used, whether it is at the time of charging or discharging is noted and whether it corresponds to a positive electrode or a negative electrode is also noted.

Two terminals in FIG. 1F are connected to a charger, and a secondary battery 40 is charged. As the charge of the secondary battery 40 proceeds, a potential difference between electrodes increases. The positive direction in FIG. 1F is the direction in which a current flows from one terminal outside the secondary battery 40 to the positive electrode current collector 12, flows from the positive electrode current collector 12 to the negative electrode current collector 14 in the secondary battery 40, and flows from the negative electrode current collector 14 to the other terminal outside the secondary battery 40. In other words, a current flows in the direction of a flow of a charging current.

Figure 3A:
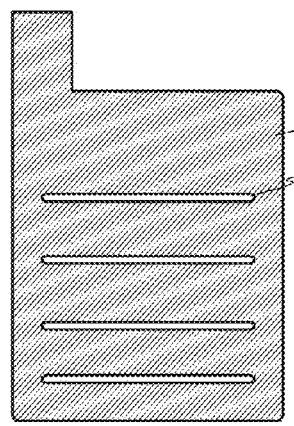
FIGS. 3A to 3F are plan views each illustrating one embodiment of the present invention.
Figure 3B:
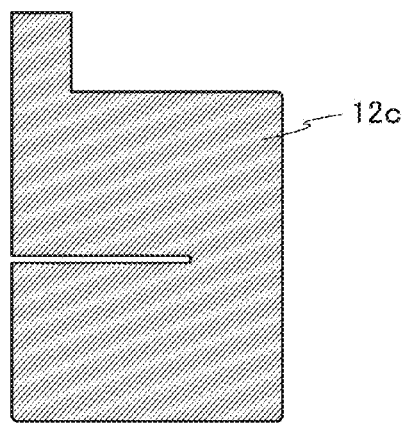
Figure 3C:
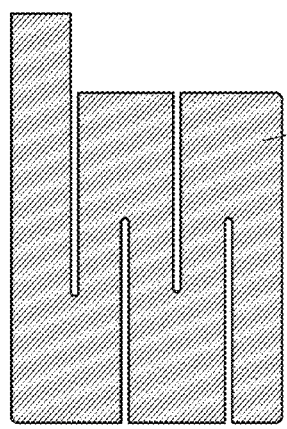
Figure 3D:
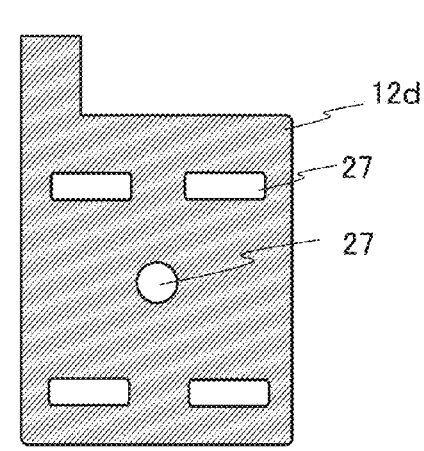
Figure 3E:
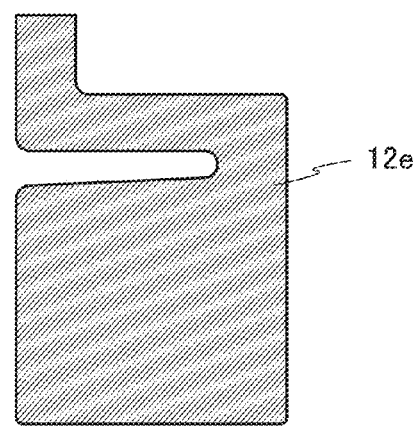
Figure 3F:
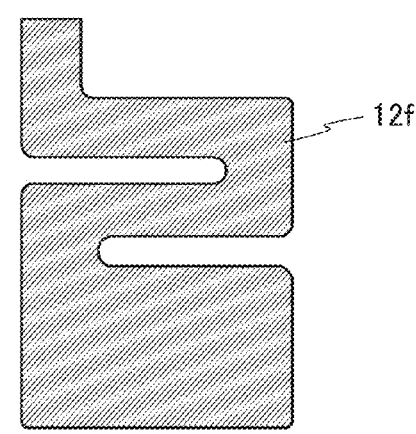

The position and the size of the cut are not particularly limited. For example, a positive electrode current collector 12*c* provided with one cut as shown in FIG. 3B or a positive electrode current collector 12*b* shown in FIG. 3C may be used. In the case of the positive electrode current collector 12*b* shown in FIG. 3C, bending can be performed in a direction different from the bending direction of the case in FIG. 2B because a direction of the cut is different from that of the case in FIG. 2B. Alternatively, a positive electrode current collector 12*a* provided with a plurality of openings 27 like slits as shown in FIG. 3A may be used, or a positive electrode current collector 12*d* provided with a plurality of rectangular openings 27 as shown in FIG. 3D may be used. Alternatively, a positive electrode current collector provided with an opening and a cut may be used. Alternatively, a positive electrode current collector 12*e* having a top surface shape provided with a meandering portion as shown in FIG. 3E or a positive electrode current collector 12*f* having a top surface shape provided with a plurality of meandering portions as shown in FIG. 3F may be used.

Note that in the examples described in this embodiment, the cut is provided in the positive electrode current collector 12 and the positive electrode active material layer 18. However, the cut is not particularly limited thereto. A cut may be provided in the negative electrode current collector 14 and the negative electrode active material layer 19. Cuts in the positive electrode current collector 12 and the negative electrode current collector 14 may be different from each other. For example, the current collector whose shape is changed more greatly by bending the secondary battery than the other current collector is provided with a larger number of cuts than the other current collector, whereby stress can be relieved more effectively.

Figure 4A:
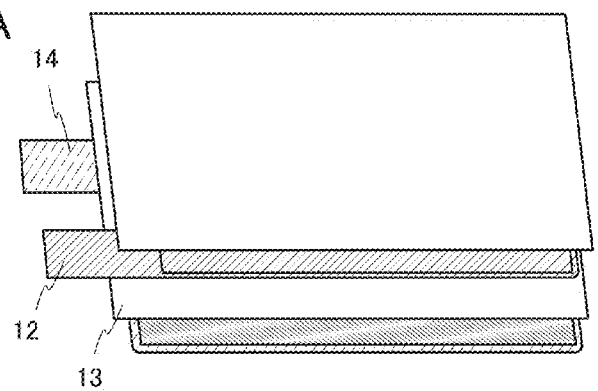
FIGS. 4A to 4C are perspective views each illustrating one embodiment of the present invention.
Figure 4B:
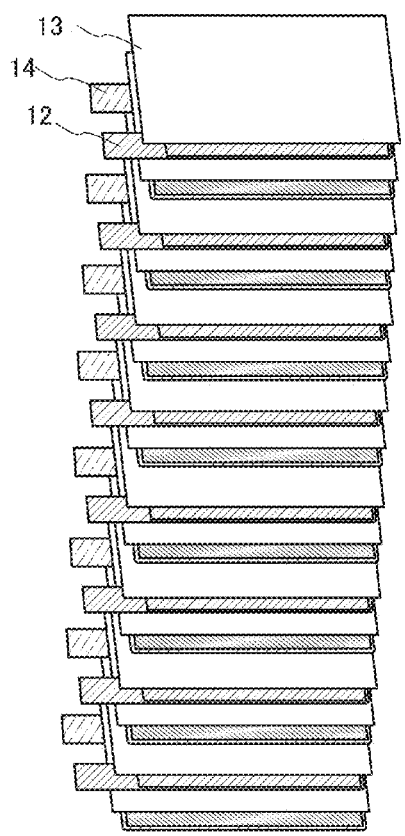

The secondary battery 40 shown in FIG. 1E is described using one positive electrode current collector, one separator, and one negative electrode current collector for simplicity. However, in an actual case, a plurality of positive electrode current collectors and a plurality of negative electrode current collectors are used. For example, eight combinations in each of which the positive electrode current collector 12, the separator 13, and the negative electrode current collector 14 are stacked as shown in FIG. 4B are used and wrapped inside a region surrounded by an exterior film. The positive electrode current collector 12 has one surface provided with a positive electrode active material layer. Note that in the structure shown in FIG. 4B, one sheet of a separator is folded so that the positive electrode current collector 12 is provided between surfaces of the folded separator; therefore, 16 separators are provided, i.e., eight sheets of separators are folded. In the case where the separators are used without being folded, 15 separators are sufficient. The separator may have a bag-like shape. In the case where the thickness of the secondary battery 40 is reduced, one combination including a stack of the positive electrode current collector 12, the separator 13, and the negative electrode current collector 14 is employed as shown in FIG. 4A. Another separator is provided in FIG. 4A, but the separator can be omitted.

Figure 4C:
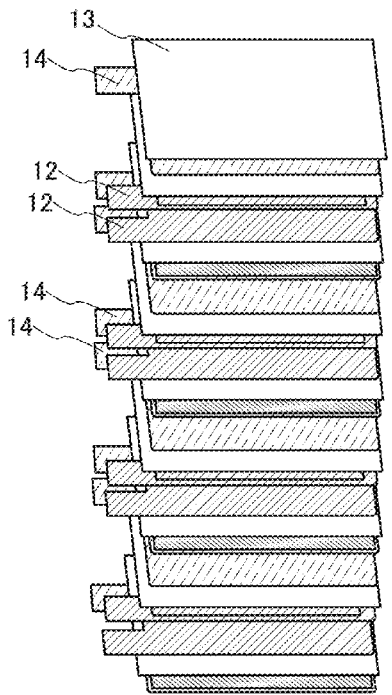

In the case where one surface of the current collector is coated with an active material, stacking may be performed so that surfaces of the positive electrode current collectors which are not coated with a positive electrode active material are in contact with each other and surfaces of the negative electrode current collectors which are not coated with a negative electrode active material are in contact with each other as shown in FIG. 4C. Stacking the current collectors in this order is preferable because the number of separators can be reduced by half.

Figure 5A:
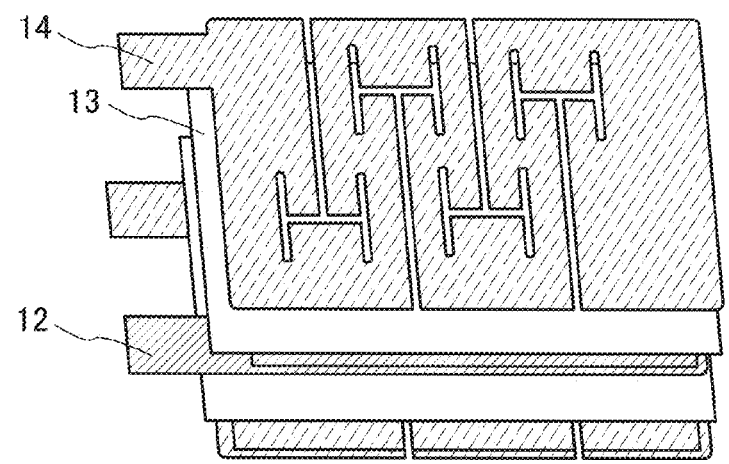
FIGS. 5A and 5B are perspective views each illustrating one embodiment of the present invention.
Figure 5B:
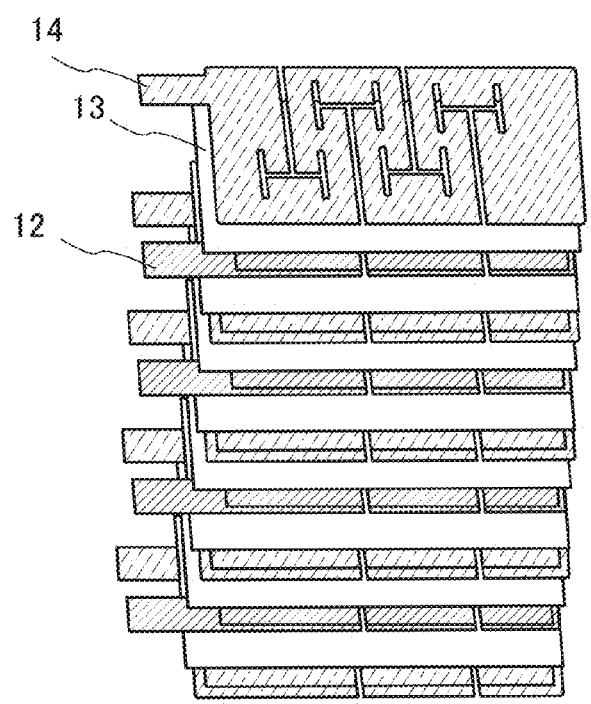

FIGS. 5A and 5B are perspective views of two combinations. Note that an example where the positive electrode current collector 12 is sandwiched between positive electrode active material layers is illustrated. Specifically, the negative electrode current collector 14, the negative electrode active material layer, the separator 13, the positive electrode active material layer, the positive electrode current collector 12, the positive electrode active material layer, the separator, the negative electrode active material layer, and the negative electrode current collector are stacked in this order. In the negative electrode current collector 14 shown in FIG. 5A, a plurality of cuts showing a geometric pattern made by laser processing is provided. The geometric pattern refers to a pattern including a stripe pattern, a checkered pattern, a meander pattern, or the like. Although two separators are illustrated in FIGS. 5A and 5B, the positive electrode current collector 12 may be placed between two surfaces formed by folding one separator. The separator may have a bag-like shape.

The negative electrode current collector may be sandwiched between negative electrode active material layers. FIG. 5B illustrates an example where three negative electrode current collectors each sandwiched between negative electrode active material layers, four positive electrode current collectors each sandwiched between positive electrode active material layers, and eight separators are sandwiched between two negative electrode current collectors each having one surface that is provided with a negative electrode active material layer.

Although an example of a small battery used in a portable information terminal or the like is described in this embodiment, one embodiment of the present invention is not particularly limited to this example. Application to a large battery provided in a vehicle or the like is also possible.

Although an example of application to a lithium-ion secondary battery is described in this embodiment, one embodiment of the present invention is not limited to this example. Application to a variety of secondary batteries such as a lead storage battery, a lithium-ion polymer secondary battery, a nickel-hydrogen storage battery, a nickel-cadmium storage battery, a nickel-iron storage battery, a nickel-zinc storage battery, a silver oxide-zinc storage battery, a solid-state battery, and an air battery is also possible. Application to a variety of power storage devices such as a primary battery, a capacitor, and a lithium-ion capacitor is also possible. Furthermore, application to a solar cell, an optical sensor, a touch sensor, a display device, a flexible printed circuit (FPC), an optical film (e.g., a polarizing plate, a retardation plate, a prism sheet, a light reflective sheet, and a light diffusion sheet), and the like is also possible.

Embodiment 2

In this embodiment, examples of electronic devices incorporating any of the lithium-ion secondary batteries described in Embodiment 1 will be described.

The secondary battery fabricated according to Embodiment 1 includes, as an exterior body, a thin film having flexibility and thus can be bonded to a support structure body with a curved surface and can change its form along the curved surface of a region of the support structure body that has a large radius of curvature.

Examples of electronic devices each using a flexible power storage device are as follows: display devices such as head-mounted displays and goggle type displays (also referred to as televisions or television receivers), desktop personal computers, laptop personal computers, monitors for computers or the like, cameras such as digital cameras or digital video cameras, digital photo frames, electronic notebooks, e-book readers, electronic translators, toys, audio input devices such as microphones, electric shavers, electric toothbrushes, high-frequency heating appliances such as microwave ovens, electric rice cookers, electric washing machines, electric vacuum cleaners, water heaters, electric fans, hair dryers, air-conditioning systems such as humidifiers, dehumidifiers, and air conditioners, dishwashers, dish dryers, clothes dryers, futon dryers, electric refrigerators, electric freezers, electric refrigerator-freezers, freezers for preserving DNA, flashlights, electric power tools, alarm devices such as smoke detectors, gas alarm devices, and security alarm devices, industrial robots, health equipment and medical equipment such as hearing aids, cardiac pacemakers, X-ray equipment, radiation counters, electric massagers, and dialyzers, mobile phones (also referred to as mobile phone devices or cell phones), portable game machines, portable information terminals, lighting devices, headphone stereos, stereos, remote controls, clocks such as table clocks and wall clocks, cordless phone handsets, transceivers, pedometers, calculators, portable or stationary music reproduction devices such as digital audio players, and large game machines such as pachinko machines.

In addition, a flexible power storage device can be incorporated along a curved inside/outside wall surface of a house or a building or a curved interior/exterior surface of a car.

FIG. 6A illustrates an example of a mobile phone. A mobile phone 7400 is provided with a display portion 7402 incorporated in a housing 7401, an operation button 7403, an external connection port 7404, a speaker 7405, a microphone 7406, and the like. Note that the mobile phone 7400 includes a power storage device 7407.

The mobile phone 7400 illustrated in FIG. 6B is bent. When the whole mobile phone 7400 is bent by the external force, the power storage device 7407 included in the mobile phone 7400 is also bent. FIG. 6C illustrates the bent power storage device 7407. The power storage device 7407 is a laminated storage battery (also referred to as a film-covered battery). The power storage device 7407 is fixed in a state of being bent. Note that the power storage device 7407 includes a lead electrode 7408 electrically connected to a current collector 7409. For example, a film functioning as an exterior body of the power storage device 7407 is embossed and the current collector is provided with a cut, so that the power storage device 7407 has high reliability even when bent.

FIG. 6D illustrates an example of a bangle-type mobile phone. A mobile phone 7100 includes a housing 7101, a display portion 7102, an operation button 7103, and a power storage device 7104. FIG. 6E illustrates the power storage device 7104 which can be bent. When a user wears the power storage device 7104 in a state of being bent on the wrist, a housing of the power storage device 7104 is deformed and the curvature thereof is partly or entirely changed. Specifically, a part or the whole of the housing or the main surface of the power storage device 7104 is changed in the range of radius of curvature from 10 mm to 150 mm. Note that the power storage device 7104 includes a lead electrode 7105 electrically connected to a current collector 7106. For example, pressing is performed to form a plurality of projections and depressions on a surface of the film functioning as the exterior body of the power storage device 7104, the current collector is provided with a cut, so that high reliability is retained even when the power storage device 7104 is bent many times with different curvatures.

Figure 7A:
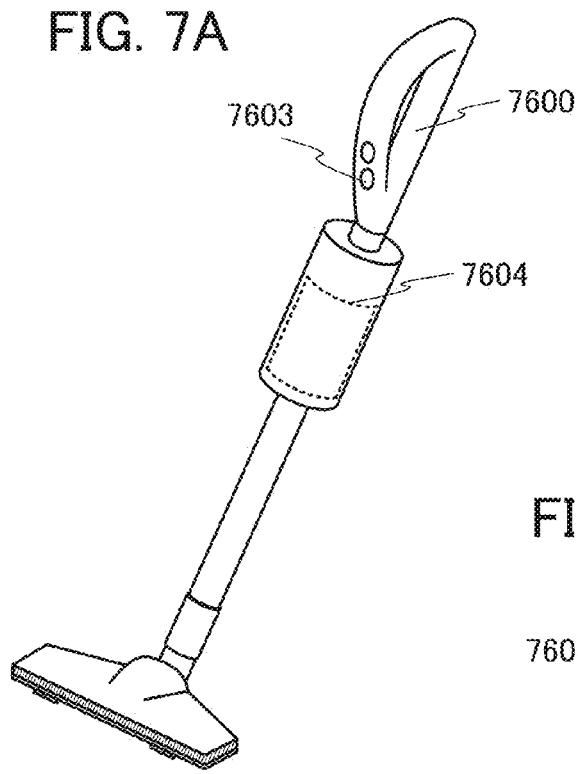
FIGS. 7A to 7D are external perspective views of an electronic device and a secondary battery of one embodiment of the present invention.
Figure 7B:
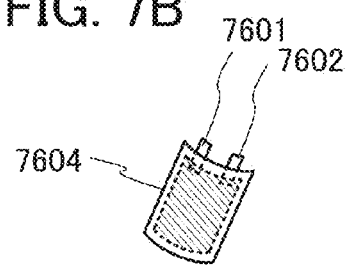

FIG. 7A illustrates an example of a vacuum cleaner. By being provided with a secondary battery, the vacuum cleaner can be cordless. To secure a dust collecting space for storing vacuumed dust inside the vacuum cleaner, a space occupied by a power storage device 7604 is preferably as small as possible. For this reason, it is useful to provide the thin power storage device 7604 that can be bent, between the outside surface and the dust collecting space. The vacuum cleaner 7600 is provided with operation buttons 7603 and the power storage device 7604. FIG. 7B illustrates the power storage device 7604 which can be bent. A film functioning as an exterior body of the power storage device 7604 is embossed and the current collector is provided with a cut, so that the power storage device 7604 has high reliability even when bent. The power storage device 7604 includes a lead electrode 7601 electrically connected to a negative electrode and a lead electrode 7602 electrically connected to a positive electrode.

Figure 7C:
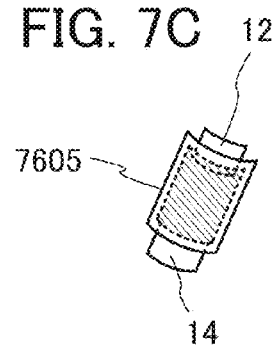

As another example of the power storage device 7604 where two lead electrodes are exposed from one short side of an exterior body, the power storage device 7605 that is capable of being bent is illustrated in FIG. 7C. The power storage device 7605 has a structure where a current collector and a lead electrode are exposed from two respective short sides of an exterior body.

Figure 7D:
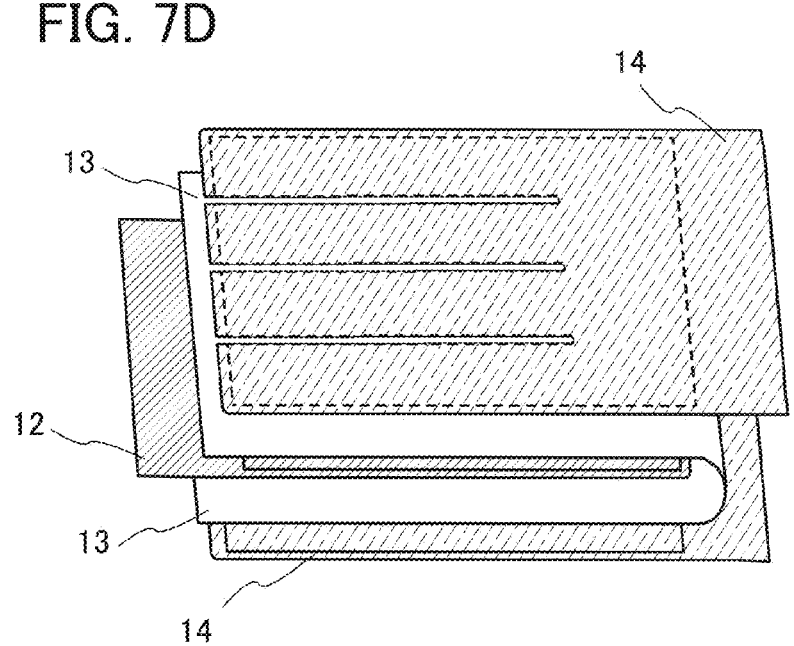

FIG. 7D illustrates an example of the internal structure of the power storage device 7605. As illustrated in FIG. 7D, the power storage device 7605 includes the positive electrode current collector 12, the separator 13, and two negative electrode current collectors 14. The two negative electrode current collectors 14 have cuts that extend in the direction perpendicular to the direction in which the power storage device 7605 is bent. The separator 13 is folded and the positive electrode current collector 12 is provided inside the folded separator 13. In addition, the positive electrode current collector 12 is sandwiched between positive electrode active material layers.

FIGS. 8A to 8C and FIGS. 9A and 9B illustrate an example of an electronic device incorporating any of the lithium-ion secondary batteries described in Embodiment 1.

Figure 8A:
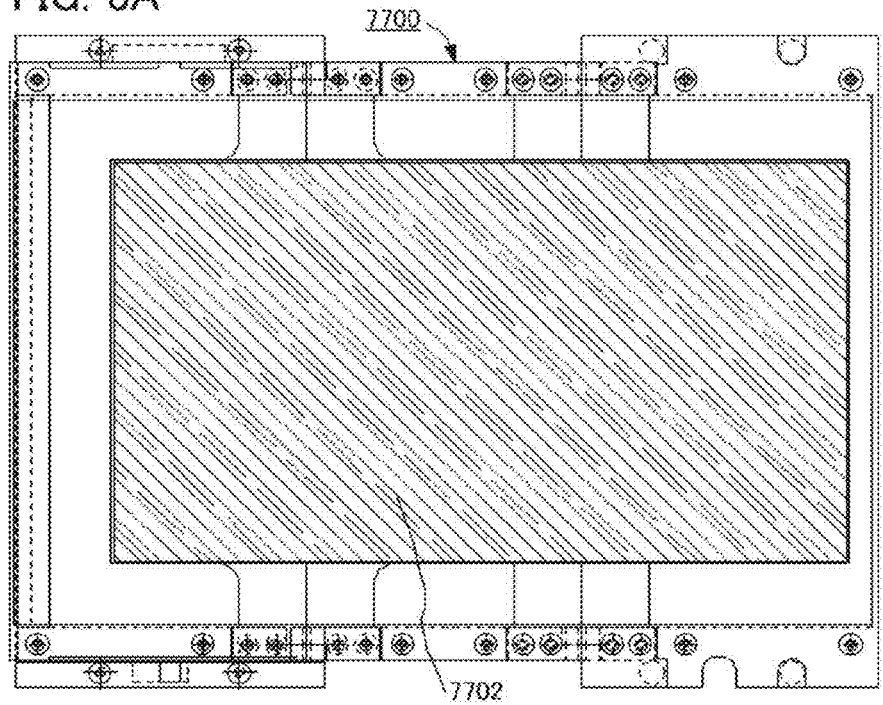
FIGS. 8A to 8C are a plan view and cross-sectional views of an electronic device.
Figure 8B:
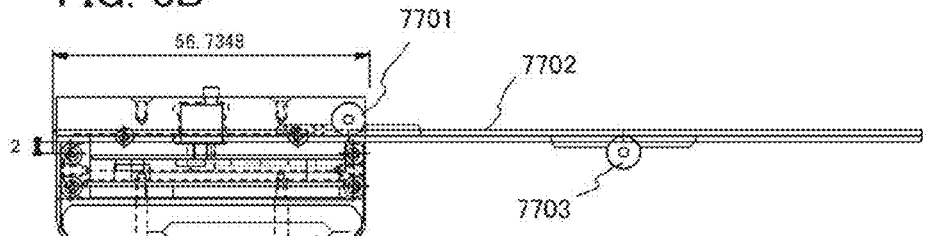
Figure 9A:
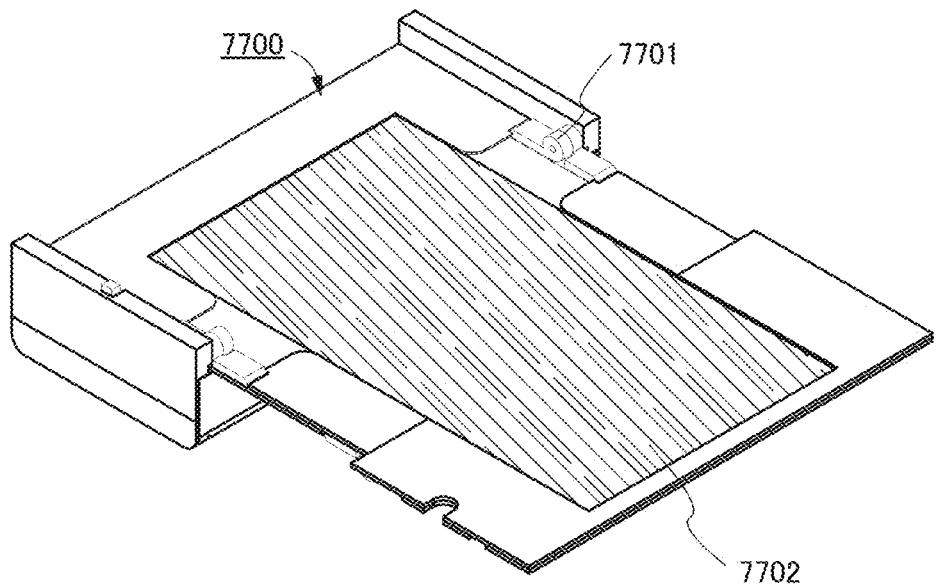
FIGS. 9A and 9B are external perspective view of the electronic device.

An electronic device 7700 has a foldable display portion 7702. FIG. 8A is a plan view showing a state where the display portion 7702 is opened. A cross-sectional view of the electronic device 7700 is shown in FIG. 8B. A power storage device 7704 is provided inside the electronic device 7700. FIG. 9A corresponds to an external perspective view showing a state where the display portion 7702 is opened.

Furthermore, hinges 7701 and 7703 that allow the display portion 7702 to be folded are provided. The display portion 7702 is an active matrix display device including an organic EL element over a plastic substrate and is a flexible display panel. For example, a transistor having an oxide semiconductor layer is included, the transistor and the organic EL element are electrically connected to each other, and the transistor and the organic EL element are placed between two plastic substrates. The electronic device shown in FIGS. 8A to 8C and FIGS. 9A and 9B is an example of the electronic device 7700 which can be reduced in size by folding at portions where the hinges 7701 and 7703 are provided.

Figure 8C:
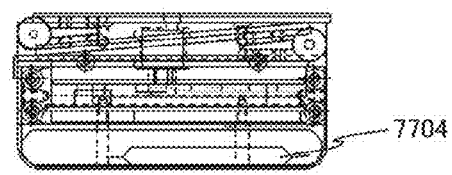
Figure 9B:
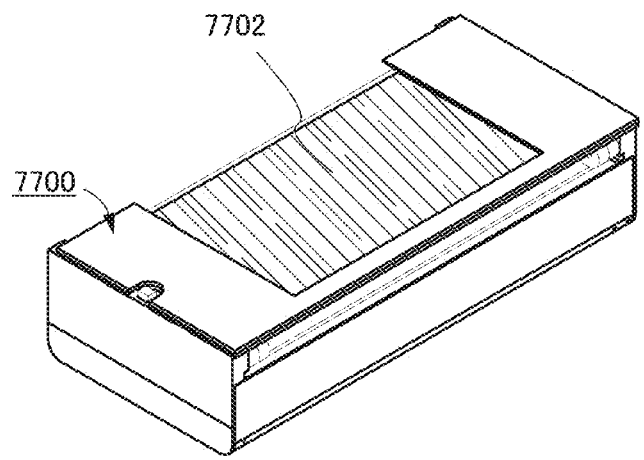

FIG. 8C is a cross-sectional view of the electronic device in a folded state. FIG. 9B corresponds to an external perspective view of the electronic device in the state. The example of folding two places using the two hinges 7701 and 7703 is given; however, folding of the electronic device is not limited thereto. An electronic device which can be folded at three or more places may be obtained by increasing the size of the display portion 7702 and the number of hinges. Alternatively, an electronic device which can be folded at one place using one hinge may be obtained.

By selecting a material (a silicone rubber or a plastic material) of the housing of the electronic device 7700 so that a flexible housing is obtained, the electronic device 7700 can be bent wholly or partly while the power storage device 7704 provided inside the housing can be bent.

The use of power storage devices that can be bent in vehicles enables production of next-generation clean energy vehicles such as hybrid electric vehicles (HEVs), electric vehicles (EVs), and plug-in hybrid electric vehicles (PHEVs). Moreover, power storage devices that can be bent can also be used in moving objects such as agricultural machines, motorized bicycles including motor-assisted bicycles, motorcycles, electric wheelchairs, electric carts, boats or ships, submarines, aircrafts such as fixed-wing aircrafts and rotary-wing aircrafts, rockets, artificial satellites, space probes, planetary probes, and spacecrafts.

Figure 10A:
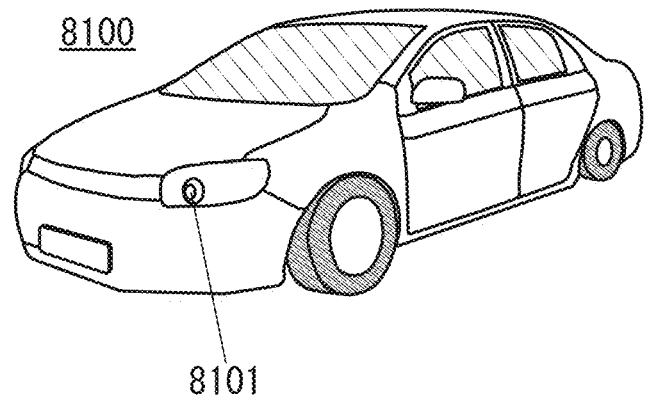
FIGS. 10A and 10B illustrate vehicles including secondary batteries.
Figure 10B:
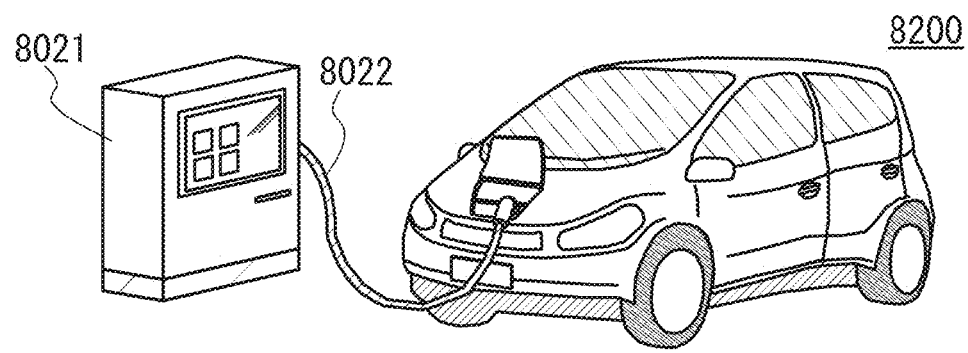

FIGS. 10A and 10B each illustrate an example of a vehicle using one embodiment of the present invention. An automobile 8100 illustrated in FIG. 10A is an electric vehicle that runs on the power of an electric motor 8106. Alternatively, the automobile 8100 is a hybrid electric vehicle capable of driving using either the electric motor or the engine as appropriate. In the case of providing a laminated secondary battery in the vehicle, a battery module including a plurality of laminated secondary batteries is placed in one place or more than one place. According to one embodiment of the present invention, a power storage device itself can be made more compact and lightweight, and for example, when the power storage device having a curved surface is provided on the inside of a tire of a vehicle, the vehicle can be a high-mileage vehicle. Furthermore, a power storage device that can have various shapes can be provided in a small space in a vehicle, which allows a space in a trunk and a space for riders to be secured. The automobile 8100 includes the power storage device. The power storage device is used not only for driving an electric motor 8106, but also for supplying electric power to a light-emitting device such as a headlight 8101 or a room light (not illustrated).

The power storage device can also supply electric power to a display device included in the automobile 8100, such as a speedometer or a tachometer. Furthermore, the power storage device can supply electric power to a semiconductor device included in the automobile 8100, such as a navigation system.

FIG. 10B illustrates an automobile 8200 including the power storage device. The automobile 8200 can be charged when the power storage device is supplied with electric power through external charging equipment by a plug-in system, a contactless power supply system, or the like. In FIG. 10B, the power storage device included in the automobile 8200 is charged with the use of a ground-based charging apparatus 8021 through a cable 8022. In charging, a given method such as CHAdeMO (registered trademark) or Combined Charging System may be employed as a charging method, the standard of a connector, or the like as appropriate. The charging apparatus 8021 may be a charging station provided in a commerce facility or a power source in a house. For example, with the use of a plug-in technique, a power storage device 8024 included in the automobile 8200 can be charged by being supplied with electric power from outside. The charging can be performed by converting AC electric power into DC electric power through a converter such as an AC-DC converter.

Further, although not illustrated, the vehicle may include a power receiving device so as to be charged by being supplied with electric power from an above-ground power transmitting device in a contactless manner. In the case of the contactless power supply system, by fitting the power transmitting device in a road or an exterior wall, charging can be performed not only when the electric vehicle is stopped but also when driven. In addition, the contactless power supply system may be utilized to perform transmission/reception between two vehicles. Furthermore, a solar cell may be provided in the exterior of the automobile to charge the power storage device when the automobile stops or moves. To supply electric power in such a contactless manner, an electromagnetic induction method or a magnetic resonance method can be used.

According to one embodiment of the present invention, the degree of flexibility in place where the power storage device can be provided is increased and thus a vehicle can be designed efficiently. Furthermore, according to one embodiment of the present invention, the power storage device itself can be made more compact and lightweight as a result of improved characteristics of the power storage device. The compact and lightweight power storage device contributes to a reduction in the weight of a vehicle, and thus increases the driving distance. Further, the power storage device included in the vehicle can be used as a power source for supplying electric power to products other than the vehicle. In such a case, the use of a commercial power source can be avoided at peak time of electric power demand.

Note that a content (or may be part of the content) described in one embodiment may be applied to, combined with, or replaced by a different content (or may be part of the different content) described in the embodiment and/or a content (or may be part of the content) described in one or a plurality of different embodiments.

Note that in each embodiment, a content described in the embodiment is a content described with reference to a variety of diagrams or a content described with a text described in this specification.

Note that by combining a diagram (or may be part of the diagram) illustrated in one embodiment with another part of the diagram, a different diagram (or may be part of the different diagram) illustrated in the embodiment, and/or a diagram (or may be part of the diagram) illustrated in one or a plurality of different embodiments, much more diagrams can be formed.

Note that contents that are not specified in any drawing or text in the specification can be excluded from one embodiment of the invention. Alternatively, when the range of a value that is defined by the maximum and minimum values is described, part of the range is appropriately narrowed or part of the range is removed, whereby one embodiment of the invention excluding part of the range can be constructed. In this manner, it is possible to specify the technical scope of one embodiment of the present invention so that a conventional technology is excluded, for example.

As a specific example, a diagram of a circuit including a first transistor to a fifth transistor is illustrated. In that case, it can be specified that the circuit does not include a sixth transistor in the invention. It can be specified that the circuit does not include a capacitor in the invention. It can be specified that the circuit does not include a sixth transistor with a particular connection structure in the invention. It can be specified that the circuit does not include a capacitor with a particular connection structure in the invention. For example, it can be specified that a sixth transistor whose gate is connected to a gate of the third transistor is not included in the invention. For example, it can be specified that a capacitor whose first electrode is connected to the gate of the third transistor is not included in the invention.

As another specific example, a description of a value, "a voltage is preferably higher than or equal to 3 V and lower than or equal to 10 V" is given. In that case, for example, it can be specified that the case where the voltage is higher than or equal to −2 V and lower than or equal to 1 V is excluded from one embodiment of the invention. For example, it can be specified that the case where the voltage is higher than or equal to 13 V is excluded from one embodiment of the invention. Note that, for example, it can be specified that the voltage is higher than or equal to 5 V and lower than or equal to 8 V in the invention. For example, it can be specified that the voltage is approximately 9 V in the invention. For example, it can be specified that the voltage is higher than or equal to 3 V and lower than or equal to 10 V but is not 9 V in the invention. Note that even when the description "a value is preferably in a certain range" or "a value preferably satisfies a certain condition" is given, the value is not limited to the description. In other words, a description of a value that includes a term "preferable", "preferably", or the like does not necessarily limit the value.

As another specific example, a description "a voltage is preferred to be 10 V" is given. In that case, for example, it can be specified that the case where the voltage is higher than or equal to −2 V and lower than or equal to 1 V is excluded from one embodiment of the invention. For example, it can be specified that the case where the voltage is higher than or equal to 13 V is excluded from one embodiment of the invention.

As another specific example, a description "a film is an insulating film" is given to describe properties of a material. In that case, for example, it can be specified that the case where the insulating film is an organic insulating film is excluded from one embodiment of the invention. For example, it can be specified that the case where the insulating film is an inorganic insulating film is excluded from one embodiment of the invention. For example, it can be specified that the case where the insulating film is a conductive film is excluded from one embodiment of the invention. For example, it can be specified that the case where the insulating film is a semiconductor film is excluded from one embodiment of the invention.

As another specific example, the description of a stacked structure, "a film is provided between an A film and a B film" is given. In that case, for example, it can be specified that the case where the film is a stacked film of four or more layers is excluded from the invention. For example, it can be specified that the case where a conductive film is provided between the A film and the film is excluded from the invention.

Note that various people can implement one embodiment of the invention described in this specification and the like. However, different people may be involved in the implementation of the embodiment of the invention. For example, in the case of a transmission/reception system, the following case is possible: Company A manufactures and sells transmitting devices, and Company B manufactures and sells receiving devices. As another example, in the case of a light-emitting device including a transistor and a light-emitting element, the following case is possible: Company A manufactures and sells semiconductor devices including transistors, and Company B purchases the semiconductor devices, provides light-emitting elements for the semiconductor devices, and completes light-emitting devices.

In such a case, one embodiment of the invention can be constituted so that a patent infringement can be claimed against each of Company A and Company B. In other words, one embodiment of the invention can be constituted so that only Company A implements the embodiment, and another embodiment of the invention can be constituted so that only Company B implements the embodiment. One embodiment of the invention with which a patent infringement suit can be filed against Company A or Company B is clear and can be regarded as being disclosed in this specification or the like. For example, in the case of a transmission/reception system, even when this specification or the like does not include a description of the case where a transmitting device is used alone or the case where a receiving device is used alone, one embodiment of the invention can be constituted by only the transmitting device and another embodiment of the invention can be constituted by only the receiving device. Those embodiments of the invention are clear and can be regarded as being disclosed in this specification or the like. Another example is as follows: in the case of a light-emitting device including a transistor and a light-emitting element, even when this specification or the like does not include a description of the case where a semiconductor device including the transistor is used alone or the case where a light-emitting device including the light-emitting element is used alone, one embodiment of the invention can be constituted by only the semiconductor device including the transistor and another embodiment of the invention can be constituted by only the light-emitting device including the light-emitting element. Those embodiments of the invention are clear and can be regarded as being disclosed in this specification or the like.

Note that in this specification and the like, it may be possible for those skilled in the art to constitute one embodiment of the invention even when portions to which all the terminals of an active element (e.g., a transistor or a diode), a passive element (e.g., a capacitor or a resistor), are the like are connected are not specified. In other words, one embodiment of the invention is clear even when connection portions are not specified. Further, in the case where a connection portion is disclosed in this specification and the like, it can be determined that one embodiment of the invention in which a connection portion is not specified is disclosed in this specification and the like, in some cases. In particular, in the case where the number of portions to which the terminal is connected may be more than one, it is not necessary to specify the portions to which the terminal is connected. Therefore, it may be possible to constitute one embodiment of the invention by specifying only portions to which some of terminals of an active element (e.g., a transistor or a diode), a passive element (e.g., a capacitor or a resistor), and the like are connected.

Note that in this specification and the like, it may be possible for those skilled in the art to specify the invention when at least the connection portion of a circuit is specified. Alternatively, it may be possible for those skilled in the art to specify the invention when at least a function of a circuit is specified. In other words, when a function of a circuit is specified, one embodiment of the present invention is clear. Moreover, it can be determined that one embodiment of the present invention whose function is specified is disclosed in this specification and the like. Therefore, when a connection portion of a circuit is specified, the circuit is disclosed as one embodiment of the invention even when a function is not specified, and one embodiment of the invention can be constituted. Alternatively, when a function of a circuit is specified, the circuit is disclosed as one embodiment of the invention even when a connection portion is not specified, and one embodiment of the invention can be constituted.

Note that in this specification and the like, part of a diagram or text described in one embodiment can be taken out to constitute one embodiment of the invention. Thus, in the case where a diagram or text related to a certain portion is described, the contents taken out from part of the diagram or the text are also disclosed as one embodiment of the invention, and one embodiment of the invention can be constituted. The embodiment of the present invention is clear. Therefore, for example, in a diagram or text in which one or more active elements (e.g., transistors or diodes), wirings, passive elements (e.g., capacitors or resistors), conductive layers, insulating layers, semiconductor layers, organic materials, inorganic materials, components, devices, operating methods, manufacturing methods, or the like are described, part of the diagram or the text is taken out, and one embodiment of the invention can be constituted. For example, from a circuit diagram in which N circuit elements (e.g., transistors or capacitors; N is an integer) are provided, it is possible to take out M circuit elements (e.g., transistors or capacitors; M is an integer, where M<N) and constitute one embodiment of the invention. For another example, it is possible to take out M layers (M is an integer, where M<N) from a cross-sectional view in which N layers (N is an integer) are provided and constitute one embodiment of the invention. For another example, it is possible to take out M elements (M is an integer, where M<N) from a flow chart in which N elements (N is an integer) are provided and constitute one embodiment of the invention. For another example, it is possible to take out some given elements from a sentence "A includes B, C, D, E, or F" and constitute one embodiment of the invention, for example, "A includes B and E", "A includes E and F", "A includes C, E, and F", or "A includes B, C, D, and E".

Note that in the case where at least one specific example is described in a diagram or text described in one embodiment in this specification and the like, it will be readily appreciated by those skilled in the art that a broader concept of the specific example can be derived. Therefore, in the diagram or the text described in one embodiment, in the case where at least one specific example is described, a broader concept of the specific example is disclosed as one embodiment of the invention, and one embodiment of the invention can be constituted. The embodiment of the present invention is clear.

Note that in this specification and the like, what is illustrated in at least a diagram (which may be part of the diagram) is disclosed as one embodiment of the invention, and one embodiment of the invention can be constituted. Therefore, when certain contents are described in a diagram, the contents are disclosed as one embodiment of the invention even when the contents are not described with text, and one embodiment of the invention can be constituted. In a similar manner, part of a diagram, which is taken out from the diagram, is disclosed as one embodiment of the invention, and one embodiment of the invention can be constituted. The embodiment of the present invention is clear.

Example 1

In this example, a plurality of sets each including a positive electrode, a separator, and a negative electrode was prepared, surrounded by a laminate film serving as an exterior body, and sealed to fabricate a sample of a secondary battery including a protruding positive electrode lead connected to the plurality of positive electrodes and a protruding negative electrode lead connected to the plurality of negative electrodes. Furthermore, an experiment of repeatedly bending the sample was performed; after the experiment, an X-ray CT image was taken to determine whether the electrode inside the sample was damaged.

Figure 13A:
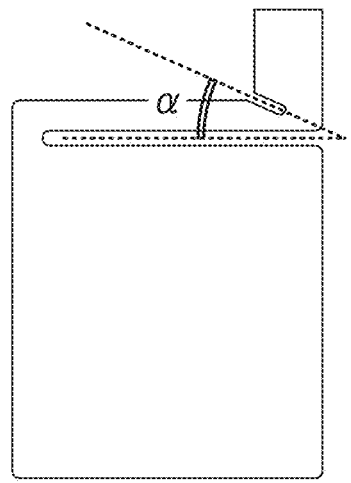
FIG. 13A is a plan view of a positive electrode.

First, as the positive electrode, an electrode having a top surface shape shown in FIG. 13A was formed. Aluminum was used for a positive electrode current collector.

Laser processing was performed on the positive electrode to form a slit having a width of greater than or equal to 0.5 mm and less than or equal to 5 mm. In this example, two slits each having a width of 2 mm were formed as shown in FIG. 13A. An angle $\alpha$ formed between a first slit and a second slit was set to be less than 90 degrees.

Figure 13B:
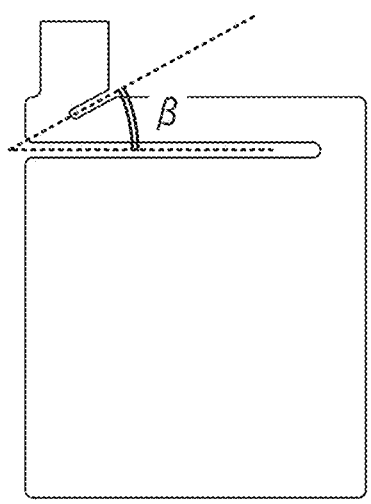
FIG. 13B is a plan view of a negative electrode.

As the negative electrode, an electrode having a top surface shape shown in FIG. 13B was formed. Copper was used for a negative electrode current collector.

Laser processing was performed on the negative electrode, and two slits each having a width of 2 mm were formed. An angle $\beta$ formed between a first slit and a second slit was set to be less than 90 degrees.

Next, six sets each including the positive electrode subjected to the laser processing, the negative electrode subjected to the laser processing, and the separator (i.e., the number of the positive electrodes and the negative electrodes was 12 in total) were prepared and stacked. These are surrounded by a laminate film subjected to embossing. Then, a protruding portion of the plurality of positive electrode current collectors and one lead electrode were electrically connected to each other by ultrasonic welding. A protruding portion of the plurality of negative electrode current collectors and the other lead electrode were similarly connected to each other.

Next, an electrolytic solution was injected into a region surrounded by the laminate film, and parts of the laminate film were bonded to each other by thermocompression bonding to seal the electrodes and the electrolytic solution. Thus, the sample of the secondary battery was fabricated.

Figure 14:
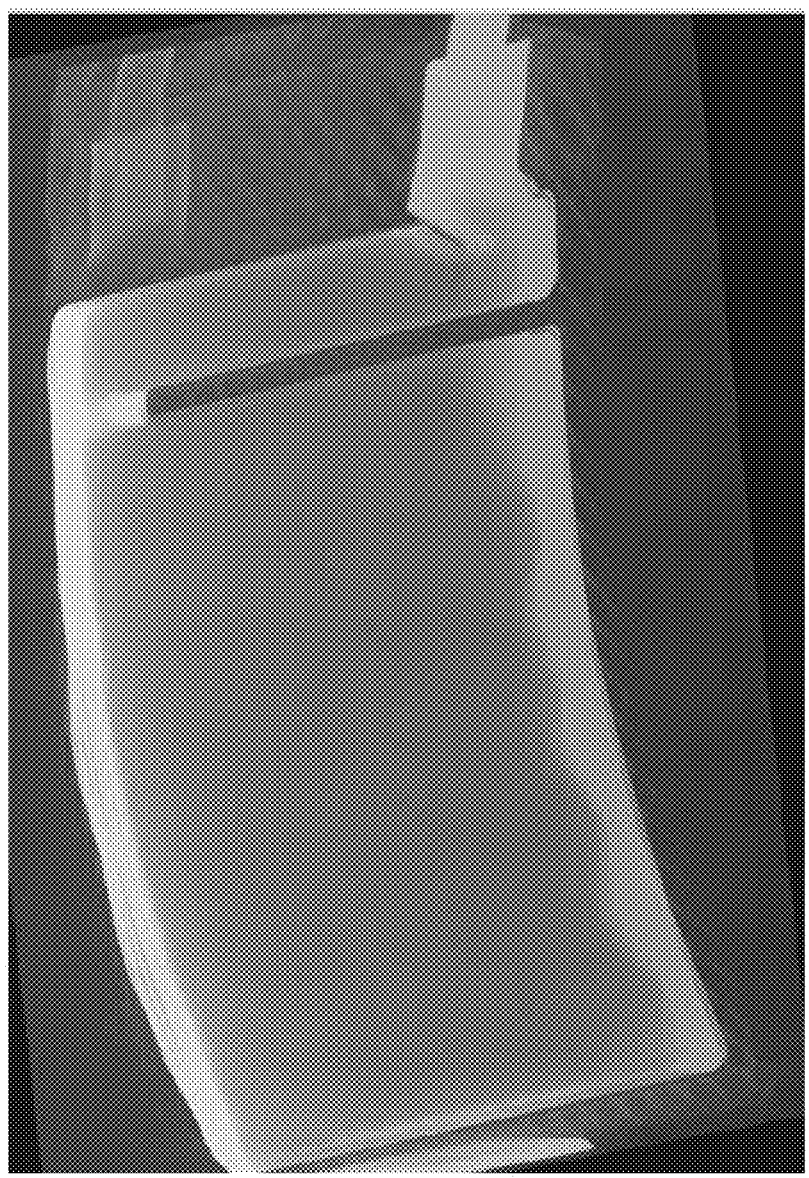
FIG. 14 is an X-ray CT image of a sample.

Whether disconnection or the like occurs in the periphery of an electrode tab by bending this sample a plurality of times was observed using an X-ray CT image. FIG. 14 is an X-ray CT image of the sample. In FIG. 14, damage is not observed inside the sample. Therefore, the electrode shapes shown in FIGS. 13A and 13B have an advantageous effect of preventing a crack or the like in the periphery of the electrode tab due to the extension of an end portion of the electrode when the sample is bent.

Example 2

In this example, a thin secondary battery (lithium-ion secondary battery) as described in Example 1 was fabricated as a power storage device of one embodiment of the present invention. The initial charge and discharge characteristics of the secondary battery and the charge and discharge characteristics of the secondary battery subjected to a bending test using a bend tester were evaluated.

A material and a fabrication method of the secondary battery used as a sample in this example are described.

First, a positive electrode is described. $LiCoO_2$ was used as a positive electrode active material, and acetylene black (AB) and PVDF as a conductive additive and a binder were mixed thereto. The proportion of the mixture of $LiCoO_2$, AB, and PVDF was as follows: $LiCoO_2$ at 90 weight %, AB at 5 weight %, and PVDF at 5 weight %. As a positive electrode current collector, aluminum with a thickness of 20 µm was used. Both surfaces or one surface of the positive electrode current collector was coated with the mixture of $LiCoO_2$, AB, and PVDF, and then, laser processing for forming two slits each having a width of 2 mm was performed so that the positive electrode has the top surface shape shown in FIG. 13A. After the laser processing, the positive electrode was cleaned with ethanol.

Next, a negative electrode is described. Graphite was used as a negative electrode active material, and a gas-phase method carbon fiber (VGCF), carboxymethyl cellulose (CMC), and styrene-butadiene rubber (SBR) as a conductive additive and a binder were mixed thereto. The proportion of the mixture of graphite, VGCF, CMC, and SBR was as follows: graphite at 96 weight %, VGCF at about 1 weight %, CMC at about 1 weight %, and SBR at about 1 weight %. Copper with a thickness of 18 µm was used as a negative electrode current collector. Both surfaces or one surface of the negative electrode current collector was coated with the mixture of graphite, VGCF, CMC, and SBR, and then, laser processing for forming two slits each having a width of 2 mm was performed so that the negative electrode has the top surface shape shown in FIG. 13B. After the laser processing, the negative electrode was cleaned with ethanol.

In this example, as positive electrodes, three electrodes in each of which both surfaces were coated with the positive electrode active material, the conductive additive, and the binder were used. In addition, as negative electrodes, two electrodes in each of which both surfaces were coated with the negative electrode active material, the conductive additive, and the binder and two electrodes in each of which one surface was coated with the negative electrode active material, the conductive additive, and the binder were used. That is, as the positive electrodes and the negative electrodes, seven metal foils were used in total.

Next, 1.2 mol/L of $LiPF_6$ was dissolved in an organic solvent in which EC, DEC, and EMC were mixed at a weight ratio of 3:6:1, and 0.5 weight % of propanesultone (PS) and 0.5 weight % of vinylene carbonate (VC) were added thereto as an additive. The resulting solution was used as the electrolytic solution.

As a separator, polypropylene was used.

As an exterior body, a laminate film subjected to embossing was used. The laminate film has a multilayer structure including a metal film (an aluminum film in this embodiment) and a plastic film formed using an organic material (a heat-seal resin film in this embodiment).

The positive electrode subjected to the laser processing, the negative electrode subjected to the laser processing, and the separator were stacked and surrounded by the laminate film. A protruding portion of the plurality of positive electrode current collectors and one lead electrode were electrically connected to each other by ultrasonic welding. A protruding portion of the plurality of negative electrode current collectors and the other lead electrode were similarly connected to each other.

Then, two sides of the laminate film were sealed by thermocompression bonding, and one side is left open for introduction of the electrolytic solution. In thermocompression bonding, a sealing layer provided over the lead electrode was also melted, thereby fixing the lead electrode and the laminate film to each other. After that, in a reduced-pressure atmosphere or an inert atmosphere, a desired amount of electrolytic solution was introduced to the inside of the laminate film in the form of a bag. Lastly, the outer edge of the film that has not been subjected to thermocompression bonding and is left open was sealed by thermocompression bonding.

As described above, the sample of a secondary battery having a capacity of approximately 300 mAh was fabricated.

Figure 15A:
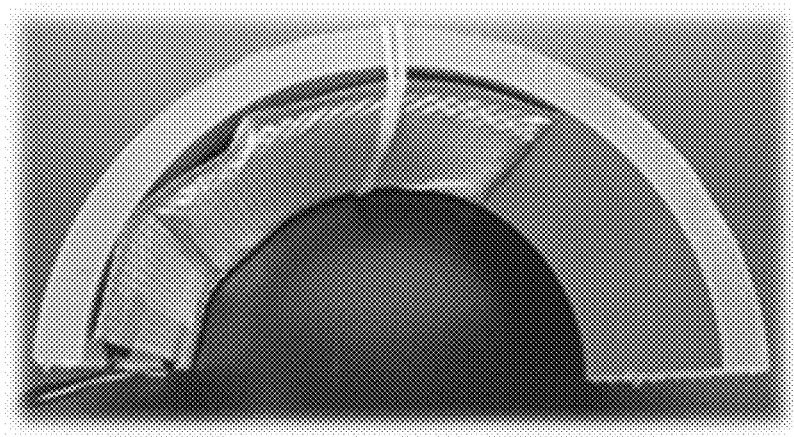
FIGS. 15A to 15D are an external photograph, an X-ray CT image of a sample, and photographs of extracted electrodes.

The secondary battery was bent and fixed to a frame having a curved surface with a curvature radius of approximately 40 mm. FIG. 15A is a photograph thereof.

Figure 15B:
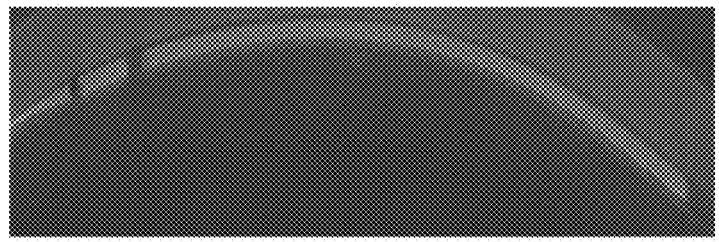

FIG. 15B corresponds to an X-ray CT image of the secondary battery fixed to the frame.

Figure 15C:
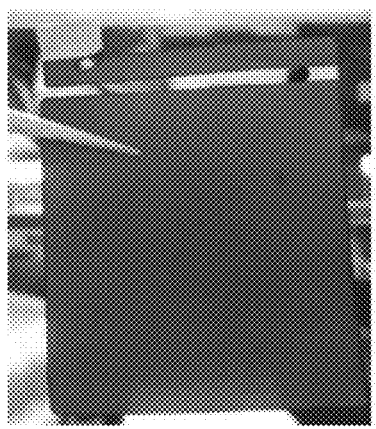
Figure 15D:
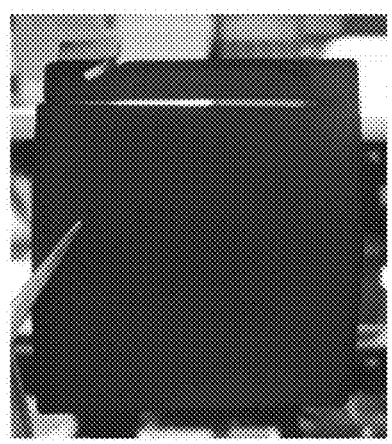

The lithium-ion secondary battery was disassembled after being charged, and the positive electrode and the negative electrode were extracted. FIGS. 15C and 15D are photographs of the positive electrode and the negative electrode, respectively, each of which is held with tweezers.

In the bending test performed 10000 times in total, X-ray CT images were taken after bending was performed 0 times, 1000 times, 3000 times, 6000 times, and 10000 times and whether the inside was damaged was determined. The images are shown in FIGS. 16A, 16B, 16C, 16D, and 16E. Charge and discharge were performed after each X-ray CT analysis to determine characteristics of the battery. FIG. 16G shows the charge and discharge characteristics. The bending test was performed in a manner similar to a bending test during charging to be described below.

Figure 16A:
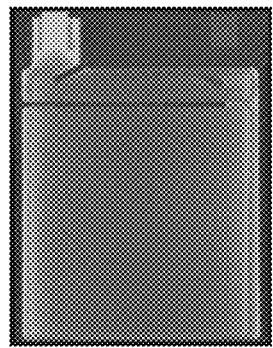
FIGS. 16A to 16G are X-ray CT images of a sample, an external photograph, and a graph showing charge and discharge characteristics.
Figure 16B:
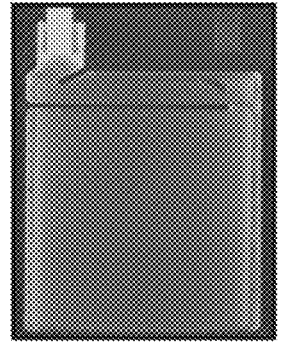
Figure 16C:
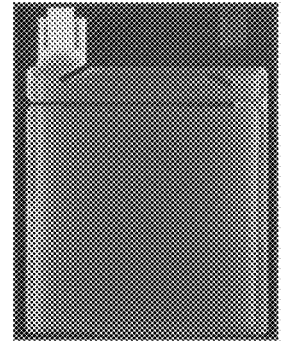
Figure 16D:
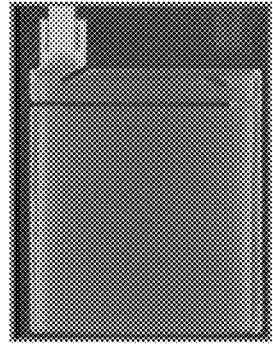
Figure 16E:
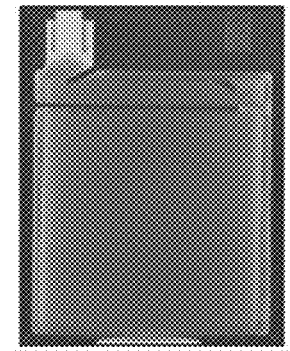
Figure 16F:
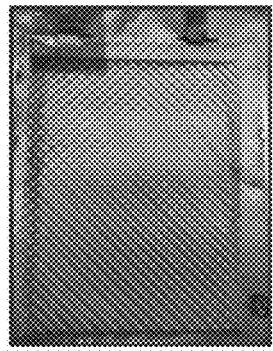
Figure 16G:
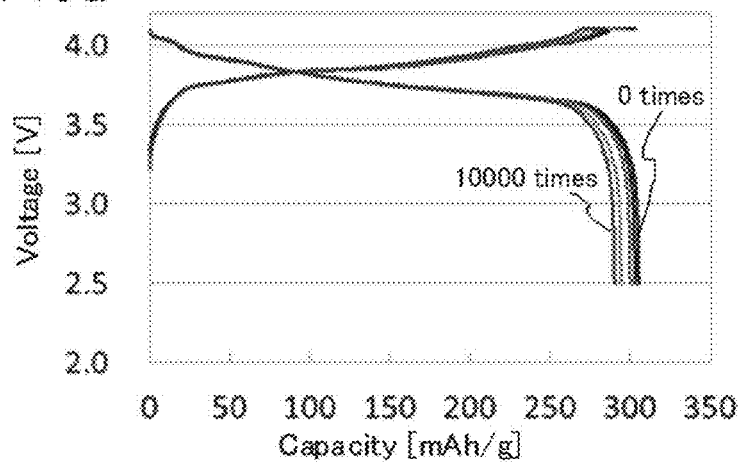

FIG. 16F is a photograph of the appearance of the secondary battery after the bending test was performed 10000 times.

Figure 17A:
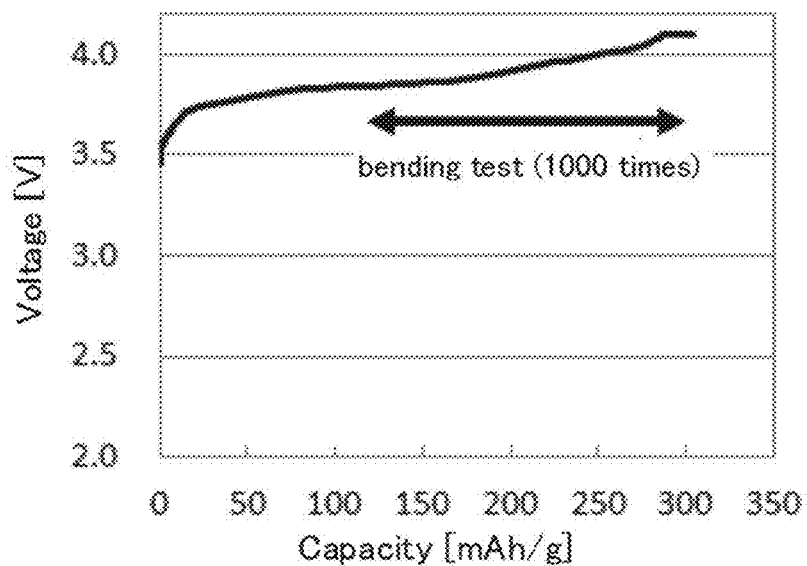
FIGS. 17A and 17B are graphs showing charge characteristics and discharge characteristics.

FIG. 17A shows the charge characteristics of the lithium-ion secondary battery which were measured while the bending test was performed with the number of replication of 1000 times in charging from the start of charge to full charge. The bending test was performed as follows. A bending tester was used, and change in the shape of the secondary battery with a maximum curvature radius of 150 mm and a minimum curvature radius of 40 mm was repeatedly performed with an electrode portion of the secondary battery sandwiched between thin metal plates from the top and the bottom. During a period of the bending test, the shape change with a maximum curvature radius of 150 mm and a minimum curvature radius of 40 mm was repeatedly performed 1000 times at time intervals of 10 s. Charging was performed in such a manner that a voltage was applied at a constant current of 61 mA corresponding to 0.2 C until the voltage reached 4.1 V and then a constant voltage of 4.1 V was applied until a current value reached 3 mA.

Figure 17B:
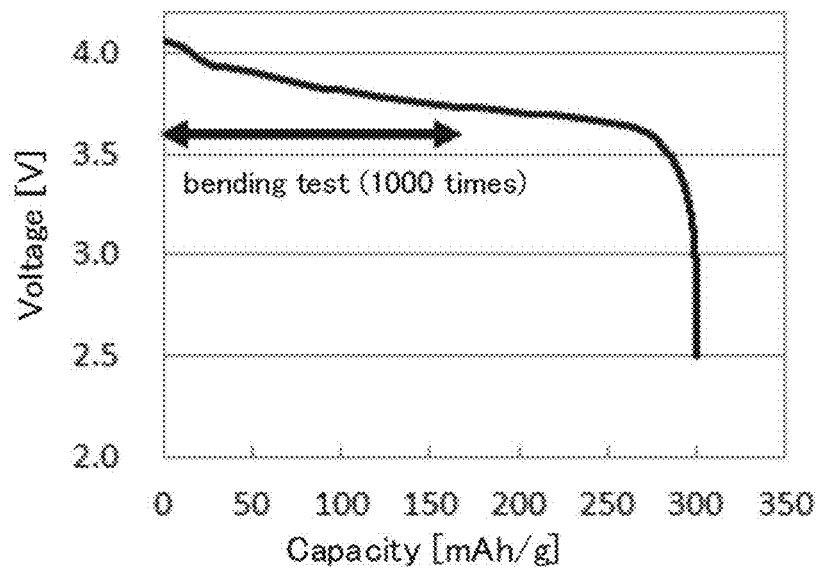

FIG. 17B shows the discharge characteristics of the lithium-ion secondary battery which were measured while the bending test was performed with the number of replication of 1000 times in discharging from the start of charging to the end of discharging. The bending test was performed in a manner similar to the above-described bending test in charging. Discharging was performed in such a manner that a voltage was applied at a constant current of 61 mA corresponding to 0.2 C until the voltage reached 2.5 V.

Here, a charge rate and a discharge rate will be described. For example, in the case of charging a secondary battery with a certain capacity [Ah] at a constant current, a charge rate of 1 C means the current value I [A] with which charging is terminated in exactly 1 h, and a charge rate of 0.2 C means I/5 [A] (i.e., the current value with which charging is terminated in exactly 5 h). Similarly, a discharge rate of 1 C means the current value I [A] with which discharging is ended in exactly 1 h, and a discharge rate of 0.2 C means I/5 [A] (i.e., the current value with which discharging is ended in exactly 5 h).

The results shown in FIGS. 17A and 17B reveal that there was no adverse effect such as a voltage change even when the bending test was performed during charging and discharging.

REFERENCE NUMERALS

11: film, 12: positive electrode current collector, 12a: positive electrode current collector, 12b: positive electrode current collector, 12c: positive electrode current collector, 12d: positive electrode current collector, 13: separator, 14: negative electrode current collector, 15: sealing layer, 16a: lead electrode, 16b: lead electrode, 17: thermocompression-bonded region, 18: positive electrode active material layer, 19: negative electrode active material layer, 20: electrolytic solution, 21: cut, 27: opening, 30: bonding layer, 40: secondary battery, 1700: curved surface, 1701: plane surface, 1702: curve, 1703: radius of curvature, 1704: center of curvature, 1800: center of curvature, 1801: film, 1802: radius of curvature, 1803: film, 1804: radius of curvature, 7100: mobile phone, 7101: housing, 7102: display portion, 7103: operation button, 7104: power storage device, 7105: lead electrode, 7106: current collector, 7400: mobile phone, 7401: housing, 7402: display portion, 7403: operation button, 7404: external connection port, 7405: speaker, 7406: microphone, 7407: power storage device, 7408: lead electrode, 7409: current collector, 7600: vacuum cleaner, 7601: lead electrode, 7602: lead electrode, 7603: operation button, 7604: power storage device, 7605: power storage device, 7700: electronic device, 7701: hinge, 7702: display portion, 7703: hinge, 7704: power storage device, 8021: charging apparatus, 8022: cable, 8024: power storage device, 8100: automobile, 8101: headlight, 8106: electric motor, 8200: automobile.

This application is based on Japanese Patent Application serial no. 2014-031995 filed with Japan Patent Office on Feb. 21, 2014, Japanese Patent Application serial no. 2014-082331 filed with Japan Patent Office on Apr. 11, 2014, and Japanese Patent Application serial no. 2014-128649 filed with Japan Patent Office on Jun. 23, 2014, the entire contents of which are hereby incorporated by reference.

The invention claimed is:

1. A battery comprising:
a first electrode comprising:
a first current collector having a first electrode tab protruding from a first portion of the first current collector, wherein the first portion has a first corner; and
a first active material layer over the first current collector; and
a second electrode comprising:
a second current collector; and
a second active material layer over the second current collector,
wherein:
a stack of the first current collector and the first active material layer has a first slit and a second slit;
the first slit extends from an edge of the stack of the first current collector and the first active material layer; and
the second slit extends inward from the first corner.

2. The battery according to claim 1, wherein an angle between the first slit and the second slit is less than 90 degrees.

3. The battery according to claim 1, further comprising:
a separator; and
an electrolytic solution.

4. The battery according to claim 1,
wherein the first electrode is a positive electrode, and
wherein the second electrode is a negative electrode.

5. The battery according to claim 1, wherein:
the second current collector has a second electrode tab protruding from a second portion of the second current collector, wherein the second portion has a second corner;
a stack of the second current collector and the second active material layer has a third slit and a fourth slit;
the third slit extends from an edge of the stack of the second current collector and the second active material layer; and
the fourth slit extends inward from the second corner.

6. The battery according to claim 5, wherein a total number of slits in the first electrode is different from a total number of slits in the second electrode.

7. An electronic device comprising:
the battery according to claim 1; and
a display portion.

8. A battery comprising:
a first electrode comprising:
a first current collector; and
a first active material layer over the first current collector; and
a second electrode comprising:
a second current collector; and
a second active material layer over the second current collector;
wherein:
the first current collector has a first electrode tab at a first end of the first current collector;
a stack of the first current collector and the first active material layer has a first slit and a second slit;
the first slit extends from a first edge of the stack of the first current collector and the first active material layer;
the second slit extends from a second edge different from the first edge, is a slit closest to the first electrode tab among all slits in the first electrode, and is not parallel or vertical to a longest edge of the first current collector;
an angle between the first slit and the second slit is less than 90 degrees;
the second current collector has a second electrode tab at a second end of the second current collector;
a stack of the second current collector and the second active material layer has a third slit and a fourth slit;
the third slit extends from a third edge of the stack of the second current collector and the second active material layer;
the fourth slit extends from a fourth edge different from the third edge, is a slit closest to the second electrode tab among all slits in the second electrode, and is not parallel or vertical to a longest edge of the second current collector; and
an angle between the third slit and the fourth slit is less than 90 degrees.

9. The battery according to claim 8, wherein a total number of the slits in the first electrode is different from a total number of the slits in the second electrode.

10. The battery according to claim 8, further comprising:
a separator; and
an electrolytic solution.

11. The battery according to claim 8,
wherein the first electrode is a positive electrode, and
wherein the second electrode is a negative electrode.

12. An electronic device comprising:
the battery according to claim 8; and
a display portion.

13. A battery comprising:
a first electrode comprising:
  a first current collector having a first electrode tab at a first end of the first current collector;
  a first active material layer over the first current collector; and
  a first slit and a second slit passing the first current collector and the first active material layer, the first slit and the second slit extending from an edge of each of the first current collector and the first active material layer; and
a second electrode comprising:
  a second current collector having a second electrode tab at a second end of the second current collector;
  a second active material layer over the second current collector; and
  a third slit and a fourth slit passing the second current collector and the second active material layer, the third slit and the fourth slit extending from an edge of each of the second current collector and the second active material layer,
wherein:
  the second slit is a slit closest to the first electrode tab among all slits in the first electrode;
  an angle between the first slit and the second slit is less than 90 degrees;
  the fourth slit is a slit closest to the second electrode tab among all slits in the second electrode; and
  an angle between the third slit and the fourth slit is less than 90 degrees.

14. The battery according to claim 13, wherein a total number of slits in the first electrode is different from a total number of slits in the second electrode.

15. The battery according to claim 13, further comprising:
a separator; and
an electrolytic solution.

16. The battery according to claim 13,
wherein the first electrode is a positive electrode, and
wherein the second electrode is a negative electrode.

17. An electronic device comprising:
the battery according to claim 13; and
a display portion.

* * * * *